(12) United States Patent
Dasalukunte et al.

(10) Patent No.: US 12,141,547 B2
(45) Date of Patent: Nov. 12, 2024

(54) DEVICE, METHOD AND SYSTEM TO SELECTIVELY PROVIDE A MODE OF RANDOM NUMBER GENERATION

(71) Applicant: Intel Corporation, Santa Clara, CA (US)

(72) Inventors: Deepak Dasalukunte, Beaverton, OR (US); Richard Dorrance, Hillsboro, OR (US); David Gonzales Aguirre, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 810 days.

(21) Appl. No.: 17/131,482

(22) Filed: Dec. 22, 2020

(65) Prior Publication Data

US 2022/0197600 A1 Jun. 23, 2022

(51) Int. Cl.
*G06F 7/58* (2006.01)
(52) U.S. Cl.
CPC .............. *G06F 7/588* (2013.01); *G06F 7/582* (2013.01); *G06F 7/584* (2013.01)
(58) Field of Classification Search
CPC .................................................. G06F 7/58–588
See application file for complete search history.

(56) References Cited

U.S. PATENT DOCUMENTS

| 4,853,884 | A * | 8/1989 | Brown ..................... G06F 7/588 708/250 |
| 8,750,504 | B1 * | 6/2014 | Muise ..................... G06F 7/588 708/255 |
| 10,116,441 | B1 | 10/2018 | Rubin et al. |
| 2009/0302224 | A1 | 12/2009 | Frank et al. |
| 2013/0010952 | A1 * | 1/2013 | Muise ..................... G06F 7/588 380/255 |
| 2013/0054544 | A1 * | 2/2013 | Li ......................... G06F 3/0674 707/693 |
| 2021/0232367 | A1 * | 7/2021 | Lamb ..................... G06F 7/588 |

OTHER PUBLICATIONS

Parallel generation of Gaussian random numbers using the Table-Hadamard transform, David B. Thomas, 21st Annual International IEEE Symposium on Field-Programmable Custom Computing Machines (Year: 2013).*

(Continued)

*Primary Examiner* — Matthew D Sandifer
(74) *Attorney, Agent, or Firm* — Essential Patents Group, LLP

(57) ABSTRACT

Techniques and mechanisms providing a mode of random number generation to satisfy a requirement for a consumer of random numbers. In an embodiment, a device comprises a Gaussian random number generator (GRNG) circuit, multiple uniform random number generator URNG circuits, and circuitry which is coupled between the GRNG circuit and the URNG circuits. Based on an indication of one or more required performance characteristics and/or one or more required statistical characteristics, a controller identifies a corresponding one of multiple available random number generation (RNG) modes. The controller communicates control signals to provide the mode with the circuitry. In another embodiment, the control signals configure the circuitry to select one or more of the URNG circuits for use in calculating random numbers with the GRNG circuit.

20 Claims, 17 Drawing Sheets

(56) References Cited

OTHER PUBLICATIONS

FPGA Gaussian Random Number Generators with Guaranteed Statistical Accuracy, David B. Thomas, 22nd Annual International IEEE Symposium on Field-Programmable Custom Computing Machines (Year: 2014).*
Structured Computer Organization, second edition, Andrew S. Tanenbaum, Prentice-Hall, pp. 10-12 (Year: 1984).*
Tiny Mersenne Twister (TinyMT): A small-sized variant of Mersenne Twister, <http://www.math.sci.hiroshima-u.ac.jp/m-mat/MT/TINYMT/index.html#tiny> (Year: 2015).*
"AMD RNG Library", <https://developer.amd.com/amd-aocl-rng-library/> accessed Dec. 2020, 2 pgs.
"Bfloat16 floating-point format", <https://en.wikipedia.org/wiki/Bfloat16_floating-point_format> accessed Dec. 2020, 5 pgs.
"Developer Reference", <https://software.intel.com/content/www/us/en/develop/documentation/oneapi-mkl-dpcpp-developer-reference/top/random-number-generators/engines-basic-random-number-generators.html> Dec. 2020, 3 pgs.
"Exponential (VSL_RNG_METHOD_EXPONENTIAL_ICDF)", <https://software.intel.com/content/www/us/en/develop/documentation/on emkl-vsperfdata/top/continuous-distributions/exponential.html> accessed Dec. 2020, 3 pgs.
"Fast Walsh-Hadamard transform", <https://en.wikipedia.org/wiki/Fast_Walsh%E2%80%93Hadamard_transform> accessed Dec. 2020, 2 pgs.
"Infer.NET", <https://dotnet.github.io/infer/> accessed Dec. 2020, 2 pgs.
"Intel oneAPI Math Kernel Library", <https://software.intel.com/content/www/us/en/develop/tools/oneapi/components/onemkl.html> accessed Dec. 2020, 6 pgs.
"Intel oneAPI Math Kernel Library Vector Statistics Random Number Generator Performance Data", <https://software.intel.com/content/www/us/en/develop/documentation/onemkl-vsperfdata/top.html> accessed Dec. 2020, 3 pgs.
"Introduction to Intel Deep Learning Boost on Second Generation Intel Xeon Scalable Processors", <https://software.intel.com/content/www/us/en/develop/articles/introduction-to-intel-deep-learning-boost-on-second-generation-intel-xeon-scalable.html> accessed Dec. 2020, 5 pgs.
"Low-discrepancy sequence", <https://en.wikipedia.org/wiki/Low-discrepancy_sequence> accessed Dec. 2020, 14 pgs.
"Pyro", <https://pyro.ai/> accessed Dec. 2020, 6 pgs.
"Random Number Generator IP Core User Guide", <https://www.intel.com/content/www/us/en/programmable/documentation/dmi1455632999173.html> accessed Dec. 2020, 4 pgs.
"TensorFlow Probability is a library for probabilistic reasoning and statistical analysis", <https://www.tensorflow.org/probability> accessed Dec. 2020, 3 pgs.
"Threefish", <https://en.wikipedia.org/wiki/Threefish> accessed Dec. 2020, 4 pgs.
"Tiny Mersenne Twister (TinyMT): A small-sized variant of Mersenne Twister", <http://www.math.sci.hiroshima-u.ac.jp/m-mat/MT/TINYMT/index.html#tiny> accessed Dec. 2020, 2 pgs.
"TRNG-IP-76 FIPS-Approved True Random Number Generators", <https://www.rambus.com/security/crypto-accelerator-hardware-cores/basic-crypto-blocks/trng-ip-76/> accessed Dec. 2020, 6 pgs.
"True Random Number Generators for Heightened Security in Any SoC", <https://www.synopsys.com/designware-ip/technical-bulletin/true-random-number-generator-security-2019q3.html> accessed Dec. 2020, 11 pgs.
Blackman, David et al., "Scrambled Linear Pseudorandom Number Generators", <http://vigna.di.unimi.it/ftp/papers/ScrambledLinear.pdf> accessed Dec. 2020, 44 pgs.
Ko, Glenn et al., "A Scalable Bayesian Inference Accelerator for Unsupervised Learning", Hotchips 2020, 27 pgs.
Ko, Glenn G. et al., "A 3mm2 Programmable Bayesian Inference Accelerator for Unsupervised Machine Perception using Parallel Gibbs Sampling in 16nm", 2020 IEEE Symposium on VLSI Circuits, 2 pgs.
Ko, Glenn G. et al., "Accelerating Bayesian Inference on Structured Graphs Using Parallel Gibbs Sampling", 2019 29th International Conference on Field Programmable Logic and Applications (FPL), 7 pgs.
Krishnan, Ranganath et al., "Improving model calibration with accuracy versus uncertainty optimization", 34th Conference on Neural Information Processing Systems, 2020, 26 pgs.
Malik, Jamshaid S. et al., "Gaussian Random Number Generation: A Survey on Hardware Architectures", ACM Computing Surveys, vol. 49, No. 3, Article 53, Oct. 2016, 37 pgs.
O'Neill, Melissa E., "PCG: A Family of Simple Fast Space-Efficient Statistically Good Algorithms for Random Number Generation", Harvey Mudd College, Computer Science Department, Technical Report, Sep. 5, 2014, 58 pgs.
Thomas, David B. et al., "Gaussian Random Number Generators", ACM Computing Surveys, vol. 39, No. 4, Article 11, Oct. 2007, 38 pgs.
Thomas, David B., "The Table—Hadamard GRNG—an area-efficient FPGA Gaussian Random Number Generator", ACM Transactions on Reconfigurable Technology and Systems, vol. V, No. N, accessed 2020, 21 pgs.
Zhang, Xiangyu et al., "Statistical Robustness of MCMC Accelerators", 2nd Workshop on Accelerated Machine Learning, May 2020, 8 pgs.
Zhao, Yinglin et al., "Exploiting Near-Memory Processing Architectures for Bayesian Neural Networks Acceleration", 2019 IEEE Computer Society Annual Symposium on VLSI (ISVLSI), 4 pgs.
Extended European Search Report from European Patent Application No. 21197305.2 notified Jan. 31, 2022, 9 pgs.
Thomas, David B., "The Table-Hadamard GRNG: An Area-Efficient FPGA Gaussian Random Number Generator", ACM Transactions on Reconfigurable Technology and Systems, vol. 8, No. 4, Article 23, Sep. 2015, 22 pgs.

* cited by examiner

FIG. 6

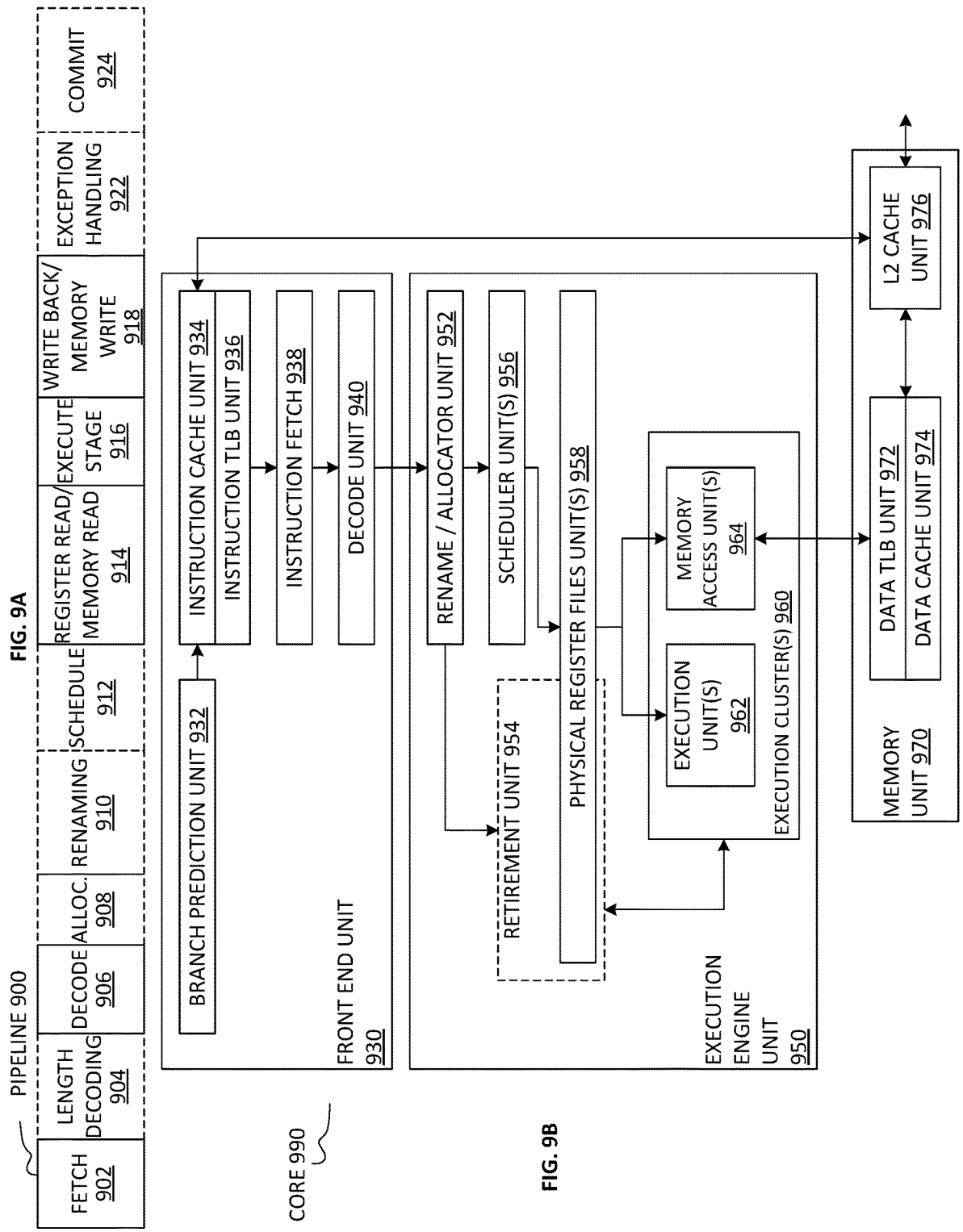

DEVICE, METHOD AND SYSTEM TO SELECTIVELY PROVIDE A MODE OF RANDOM NUMBER GENERATION

BACKGROUND

1. Technical Field

This disclosure generally relates to random number generation and more particularly, but not exclusively, to generating randomized data according to one or more criteria.

2. Background Art

Various data processing technologies rely on probabilistic (or "randomized") algorithms which provide results that, in one or more respects, exhibit some dependence on chance. Probabilistic algorithms are typically run on general-purpose processors such as those in client/server systems. These general-purpose processors usually support the generation of random numbers through a library of pre-compiled math routines, wherein the random numbers are generated in batch mode, and then stored in a buffer or other repository for subsequent use as the need arises.

Some security, performance and/or other disadvantages of this approach can be mitigated by using purpose-built random number generation circuitry. However, the design such circuitry has traditionally been constrained by considerations (such as the amount of required circuit resources, the rate at which random numbers are to be provided, the susceptibility of such random numbers to cryptanalysis by malicious agents) which often conflict with each other.

As probabilistic algorithms continue to scale in terms of variety, uses and capability, there is expected to be an increasing premium placed on improvements to the provisioning of random numbers for use by such algorithms.

BRIEF DESCRIPTION OF THE DRAWINGS

The various embodiments of the present invention are illustrated by way of example, and not by way of limitation, in the figures of the accompanying drawings and in which:

FIG. 6 illustrates a timing diagram showing operations of a Hadamard transform circuit to generate random numbers according to an embodiment.

FIG. 9A is a block diagram illustrating both an exemplary in-order pipeline and an exemplary register renaming, out-of-order issue/execution pipeline according to an embodiment.

FIG. 9B is a block diagram illustrating both an exemplary embodiment of an in-order architecture core and an exemplary register renaming, out-of-order issue/execution architecture core to be included in a processor according to an embodiment.

DETAILED DESCRIPTION

Figure 1:
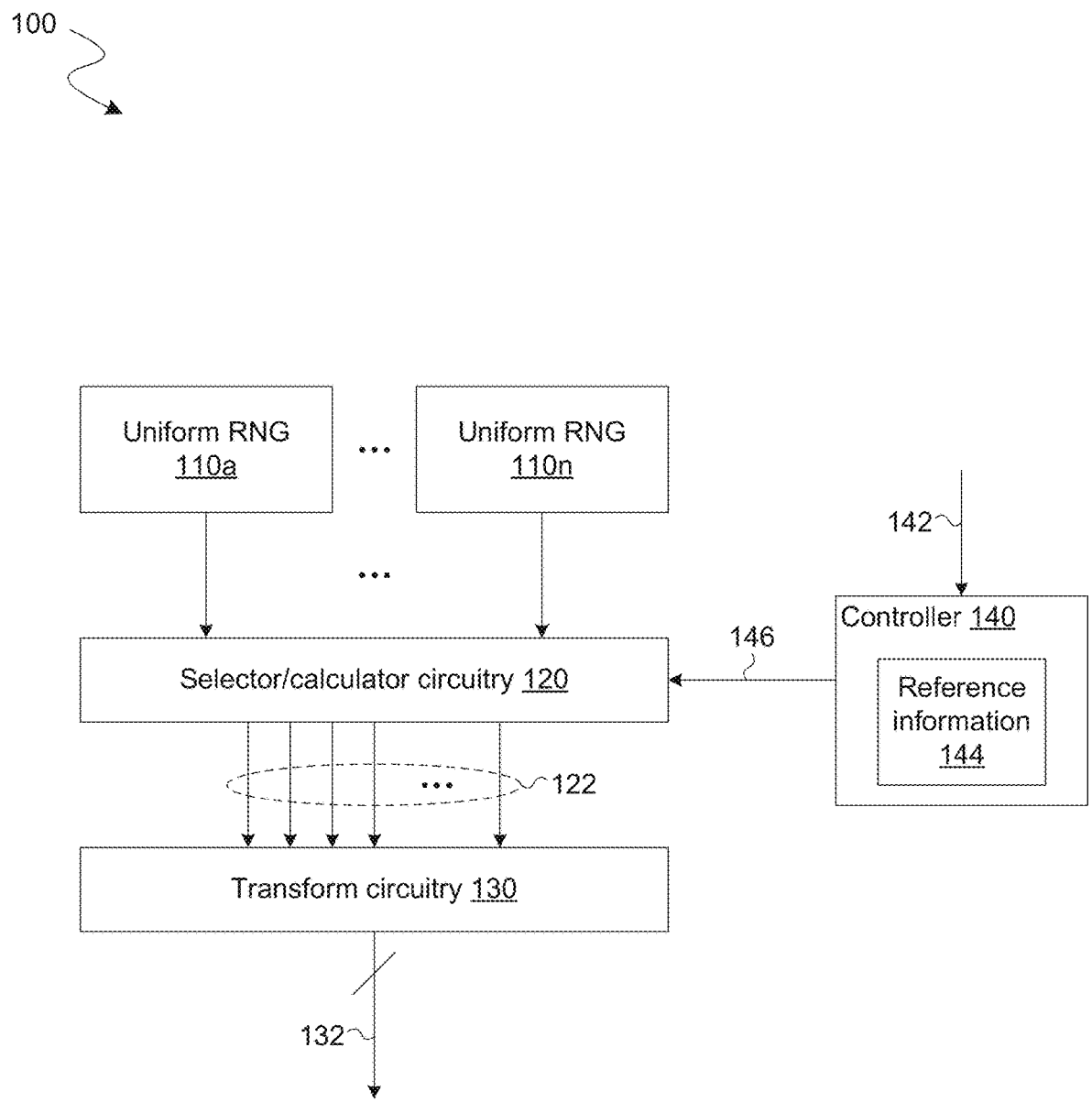
FIG. 1 illustrates a functional block diagram showing features of a device to selectively determine a mode for generating random numbers according to an embodiment.

Embodiments described herein variously provide techniques and mechanisms for a generation of random numbers which satisfies one or more predefined requirements. The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including configurable random number generation circuitry.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Various embodiments selectively provide one of various possible modes of operation by a device, where said mode is to accommodate one or more requirements of a consumer of random numbers generated by said device. During such a mode, a random number generator (RNG) of a first type generates random numbers based on an input of another random number which is generated based on a selection—by the mode—from among multiple random number generators (RNGs) of a second type. In one such embodiment, random numbers generated with a random number generator of the first type have a different distribution by type, as compared to a distribution of random numbers generated with a random number generator of the second type. For example, a random number generator of the first type generates random numbers which are relatively more uniformly distributed, as compared to random numbers generated with a random number generator of the second type.

Unless otherwise indicated, the word "uniform"—as used herein in the context of terms such as "uniform random number generator" (or "URNG"), "uniform random numbers" etc.—refers to the characteristic of some set of random numbers being uniformly distributed over a given interval, or at least relatively more uniformly distributed than some other set of random numbers.

FIG. 1 shows features of a device 100 to selectively provide random number generation functionality according to an embodiment. Device 100 is one example of an embodiment wherein a performance and/or statistical requirement of a consumer of random numbers is used as a basis for determining a mode of random number generation—e.g., where the mode selects from among multiple available uniform random number generators to provide input for generating random numbers which have a non-uniform distribution.

As shown in FIG. 1, device 100 comprises transform circuitry 130, multiple uniform RNGs URNGs 110a, ..., 110n, and selector/calculator circuitry 120 which is coupled between transform circuitry 130 and URNGs 110a, ..., 110n. In some embodiments, transform circuitry 130 comprises a first RNG which, with respect to the providing of a given distribution of random numbers, is less uniform than any of URNGs 110a, ..., 110n.

For a given ith RNG (UNRGi) of the URNGs 110a, ..., 110n, random number generation by that UNRGi is characterized by a respective set $\{Pi\}$ of one or more statistical characteristics and/or a respective one or more performance characteristics—e.g., where $\{Pi\}=\{pi1, pi2, \ldots$ etc.$\}$. For example, random number generation by URNG 110a exhibits a first one or more characteristics $\{Pa\}=\{pa1, pa2, \ldots$ etc.$\}$, wherein random number generation by URNG 110n exhibits a second one or more characteristics $\{Pn\}=\{pn1, pn2, \ldots$ etc.$\}$. The various values pi1, pi2, ... etc. of a given ith characteristic set each represent a respective statistical metric, performance metric, or combination thereof.

By way of illustration and not limitation, one or more statistical characteristics of a given random number generator include (for example) an ability to satisfy a frequency test, a serial test, a poker test, a runs test, a birthday spacings test, and/or any of various other commonly accepted statistical tests. The National Institute of Standards and Technology (NIST) has published standardized versions of some of these tests in SP800-22 "A Statistical Test Suite for Random and Pseudorandom Number Generators for Cryptographic Applications." In various embodiments, such a test is evaluated on a pass/fail basis—e.g., with a certain minimum P-value or maximum P-value.

Additionally or alternatively, statistical characteristics of a given random number generator include conformity to the properties of a particular one or more numerical transforms of a given transform type. Such one or more numerical transforms include, for example, any of various transforms each from a respective uniform distribution of numbers to a respective other (non-uniform) type of distribution such as exponential, Gaussian, or the like. For example, application of a Hadamard transform to random numbers that are uniformly distributed, with a certain mean and variance, results in other random numbers which can be expected to have a Gaussian distribution with another particular mean and variance. If a result of a Hadamard transform deviates from an expected mean and variance, then an assumption of uniformity of the original random numbers (with a certain mean and variance) is incorrect.

Additionally or alternatively, statistical characteristics of a given random number generator include (for example) some threshold minimum level of complexity, which is often interpreted as a number of information bits of "state". By way of illustration and not limitation, a 32-bit Linear Congruential Generator (LCG) algorithm—of the form $(X[n+1]=\{A*X[n]+C\} \mod M)$—can have up to 32-bits of state, but does not necessarily have a minimum of 32-bits of state. For example, if $A=2$, and $C=0$ for the 32-bit LCG $(M=2^{32})$, then an odd random number would be prevented, and the effective number of state bits would only be 31.

One or more performance characteristics of a given random number generator include (for example) a throughput (e.g., bits per second), and a minimum number of state bits (which, strictly speaking, is also a statistical characteristic). Such characteristics are often determinative of a size of multiplier circuits and/or adder circuits needed, which—in turn—affects data throughput, latency, power usage, etc.

Transform circuitry 130 illustrates any of various types of circuit hardware which are operable to receive random numbers which have a first type of distribution (e.g., a uniform distribution), and to perform a transformation of said random numbers to generate other random numbers which have a different (e.g., Gaussian) distribution. For example, transform circuitry 130 is coupled to receive an input (e.g., including the illustrative signals 122 shown) which are provided by selector/calculator circuitry 120 based on one or more outputs each from a respective selected one of URNGs 110a, ..., 110n. In various embodiments, transform circuitry 130 comprises a Hadamard transform circuit and/or other circuitry which is suitable to implement a GRNG. Similar to URNGs 110a, ..., 110n, in some embodiments, random number generation by such a GRNG of transform circuitry 130 exhibits a respective one or more characteristics $\{Pg\}=\{pg1, pg2, \ldots$ etc.$\}$.

Selector/calculator circuitry 120 comprises any of a variety of combinations of selector circuits—e.g., including one or more multiplexers, switch circuits and/or the like—which are configurable to receive one or more inputs from a selected one or more of URNGs 110a, ..., 110n. Although some embodiments are not limited in this regard, selector/calculator circuitry 120 further comprises any of a variety of other circuits—coupled to the one or more selector circuits of selector/calculator circuitry 120—which are to perform calculations based on values represented by the received one or more inputs.

For example, one or more calculation circuits of selector/calculator circuitry 120 perform operations on selected outputs from URNGs 110a, ..., 110n to generate signals 122 which are received by transform circuitry 130. The signals 122, representing random numbers which have a first (e.g., equal) distribution, are subjected to operations by transform circuitry 130 to generate signals 132 representing other random numbers which have a second (e.g., Gaussian) distribution.

In an embodiment, various circuitry of device 100—e.g., including selection/calculation circuitry 120 and, in some embodiments, transform circuitry 130—is configurable (for example, reconfigurable) to operate at different times in any of various possible modes Ma, Mb, ..., etc. For example, a given mode M of device 500 comprises a configuration of selector/calculator circuitry 120 to select a particular one or more inputs to be received each from a respective one of URNG 110a, ..., 110n. Alternatively or in addition, the given mode M of device 500 comprises a configuration of selector/calculator circuitry 120 to perform a particular one or more operations with the selected one or more inputs from URNG 110a, ..., 110n.

Some embodiments selectively provide such a mode M of device 500 based on the respective characteristic sets $\{Pi\}, \ldots, \{Pn\}$ for URNGs 110a, ..., 110n, as well as a characteristic set $\{Pg\}$ for some or all of transform circuitry 130, and one or more requirements of a consumer of random numbers. By way of illustration and no limitation, a controller 140 of device 100—the controller 140 coupled to selector/calculator circuitry 120—comprises circuitry which is configured to receive an indication of some one or more criteria for random number generation which is to be performed by device 100. In the example embodiment shown, such an indication is provided by a signal 142 which controller 140 receives (for example) from any of various agents including, but not limited to, an executing software process, performance monitoring circuitry, a commercial entity (such as a manufacturer, distributor, wholesaler, etc.), a system administrator, or the like. Some embodiments are not limited with respect to a particular basis on which—and/or a particular source from which—such criteria are communicated to controller 140.

Based on signal 142, controller 140 determines that the indicated criteria corresponds to one mode of multiple possible modes of device 100. For example, controller 140 includes, is coupled to access, or otherwise operates based on some predetermined reference information 144 which specifies or otherwise indicates that certain requirement sets {Pya}, {Pyb}, . . . , etc.—each comprising a respective one or more required statistical and/or performance characteristics—each correspond to a respective one of various Ma, Mb, . . . , etc. of device 100. For example, reference information 144 indicates that, during operation in mode Ma, device 100 will exhibit one or more statistical characteristics and/or one or more performance characteristics which satisfy the one or more required characteristics in set {Pya}. By contrast, during operation in mode Mb, device 100 will exhibit one or more characteristics which satisfy the one or more required characteristics in set {Pyb}. Reference information 144 is provided to device 100 by any of various agents including, but not limited to, a commercial entity, system administrator, end user, or the like. In some embodiments, reference information 144 is based on empirical testing, or statistical modeling, for example. Some embodiments are not limited with respect to a particular basis on which—and/or a particular source from which—reference information 144 is made available to controller 140.

In an embodiment reference information 144 is implemented with a table, linked list or other suitable data structure which controller 140 searches, based on signal 142, to identify a mode M which will satisfy the one or more requirements indicated. Based on such a search, controller 140 generates one or more control signals (e.g., including the illustrative control signal 146 shown) for selector/calculator circuitry 120—and/or other circuit resources of device 100—to be configured to provide the identified mode M.

Figure 2:
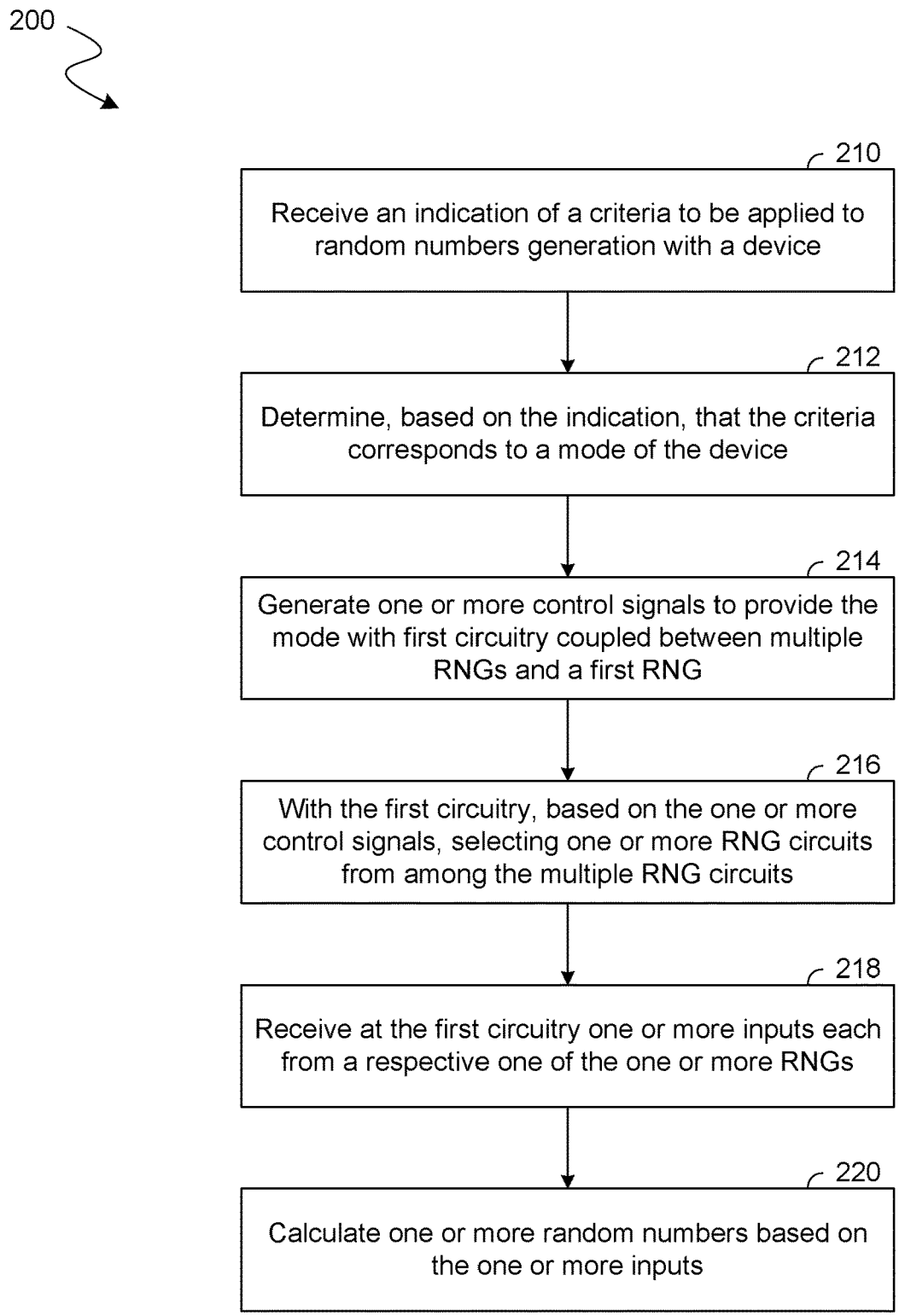
FIG. 2 illustrates a flow diagram showing features of a method to operate random number generator circuitry according to an embodiment.

FIG. 2 shows features of a method 200 to determine a mode of random number generation according to an embodiment. Method 200 is one example of an embodiment which is performed with a device comprising multiple RNGs, a first RNG, and first circuitry (e.g., selector/calculator circuitry 120) which coupled between the multiple RNGs and the first RNG. For example, method 200 is performed with circuitry that provides some or all of the functionality of device 100.

As shown in FIG. 2, method 200 comprises (at 210) receiving an indication of a criteria to be applied to a generation of one or more random numbers. For example, controller 140, or other suitable circuitry, receives information which specifies or otherwise indicates a set {Py} of one or more requirements (referred to herein as a "criteria") to be applied to a generation of one or more random numbers. The requirement set {Py} includes one or more required statistical characteristics and/or a one or more required performance characteristics—e.g., where {Py}={py1, py2, . . . etc.}. In an embodiment, the receiving at 210 comprises controller 140 of device 100 receiving the indication via signal 142.

Based on the indication received at 210, method 200 (at 212) determines that the criteria corresponds to a mode of the device—e.g., wherein the mode comprises a configuration of the first circuitry to select from among the multiple RNGs. For example, the determining at 212 comprises accessing reference information which identifies modes Ma, Mb, . . . , etc. of the device as corresponding (respectively) to requirement sets {Pya}, {Pyb}, . . . , etc. which each include a respective one or more required characteristics. In an embodiment, such reference information identifies mode Ma as being able to satisfy requirement set {Pya}, mode Mb as being able to satisfy requirement set {Pyb}, and the like. Based on such reference information, the determining at 212 identifies one of the requirement sets {Pya}, {Pyb}, . . . , etc. as most closely matching the criteria indicated at 212, where the corresponding one of modes Ma, Mb, . . . , etc. is thereby identified as a mode to be configured to meet the criteria.

Method 200 further comprises (at 214) generating one or more control signals to provide the mode with the first circuitry. In various embodiments, the one or more control signals implement the mode at least in part by configuring multiplexer circuitry, switch circuitry and/or the like (e.g., at selector/calculator circuitry 120) to select some particular subset of the multiple RNGs—e.g., where the selected one or more RNGs are each to provide a respective one or more random numbers.

In one such embodiment, the one or more control signals implement the mode further by configuring calculation circuitry (e.g., at selector/calculator circuitry 120) to perform a particular one or more calculations based on random numbers received from the selected one or more RNGs. By way of illustration and not limitation, such calculation circuitry is configured to perform a selected one or more of various XOR operations, various Galois field addition and multiplication operations, various bit shifts, various data rotations, and/or the like. In one example embodiment, such calculations result in the determining of signals 132.

Additionally, or alternatively, the one or more control signals implement the mode further by configuring other circuitry which multiplexes between, or otherwise switchedly selects from among, some or all of one or more outputs of the multiple RNGs, one or more outputs of the first RNG, and (in some embodiments) one or more outputs from other circuitry which, for example, transforms random numbers output by the first RNG or the multiple RNGs.

Additionally, or alternatively, the one or more control signals implement the mode further by configuring a Hadamard transform circuit and/or other circuitry of the first RNG. For example, some embodiments enable a selective configuring of a length, a size, and/or a bit width of a Hadamard transform to be performed. In an embodiment, the first RNG generates random numbers which are characterized by a first distribution, wherein, for each RNG of the multiple RNGs, the each RNG generates random numbers which are characterized by a respective second distribution which is more uniform than the first distribution. For example, the multiple RNGs comprise one of a Xoroshiro RNG, a Tiny Mersenne Twister (TinyMT) RNG, or a hybrid linear feedback shift register and cellular automata shift register (LFSR/CASR) RNG.

Method 200 further comprises (at 216) performing a selection, with the first circuitry, of one or more RNGs from among the multiple RNGs, where such selection is based on the one or more control signals. Further based on the one or more control signals, method 200 (at 218) receives one or more inputs at the first circuitry, where the one or more inputs are each from a respective one of the one or more RNGs. Method 200 further comprises (at 220) calculating the one or more random numbers based on the one or more inputs—e.g., where such calculating is performed with selector/calculator circuitry 120 and transform circuitry 130.

In various embodiments, method 200 comprises additional operations (not shown) to similarly provide one or more other modes of random number generation each based on respective criteria for a consumer of random numbers. For example, such additional operations comprise the device receiving a second indication of a second criteria to be applied for a second generation of random numbers—e.g., where, based on the second indication, the device determines that that the second criteria corresponds to a second mode of the device. In one such embodiment, the device then generates a second one or more control signals to provide the second mode with the first circuitry. Based on the second one or more control signals, the first circuitry selects a second one or more RNGs, from among the multiple RNGs, to provide a second one or more inputs for use in calculating the second one or more random numbers.

Figure 3:
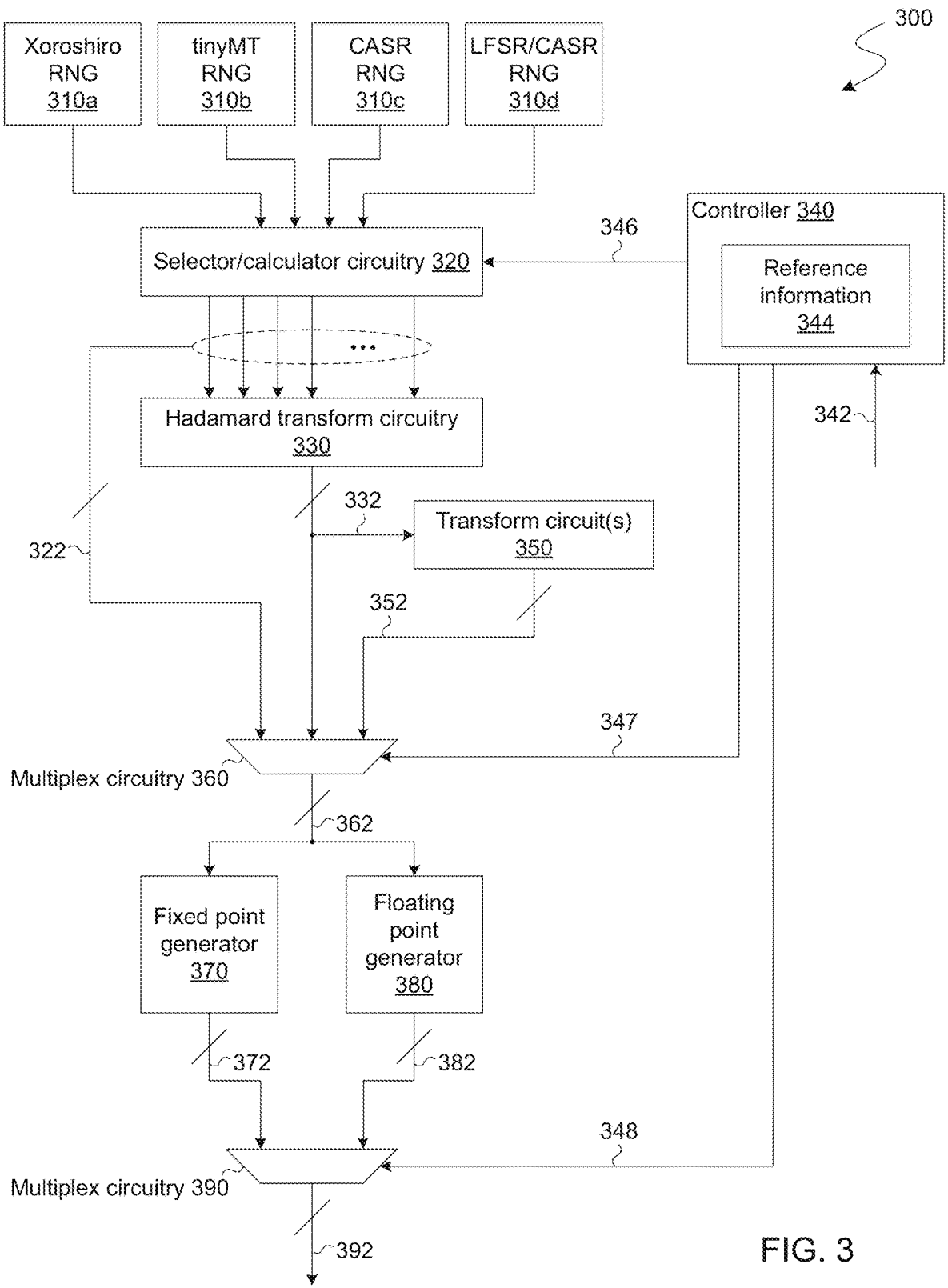
FIG. 3 illustrates a functional block diagram showing features of a device to generate random numbers according to one or more criteria according to an embodiment.

FIG. 3 shows features of a device 300 to selectively provide any of multiple modes of random number generation according to an embodiment. In various embodiments, device 300 includes features of device 100—e.g., wherein device 300 is operable to perform some or all of method 200.

As shown in FIG. 3, device 300 comprises Hadamard transform circuitry 330, multiple RNGs 310a, 310b, 310c, 310d, and selector/calculator circuitry 320 which is coupled between transform circuitry 330 and RNGs 310a, 310b, 310c, 310d. In various embodiments, selector/calculator circuitry 320 provides functionality of selector/calculator circuitry 120—e.g., wherein multiple RNGs 310a, 310b, 310c, 310d correspond functionally to URNGs 110a, . . . , 110n (for example). In the example embodiment shown, RNG 310a is of a Xoroshiro RNG type—e.g., wherein RNG 310b is of a Tiny Mersenne Twister (TinyMT) RNG type, an RNG 310c is of a cellular automata shift register (CASR) RNG type. Additionally or alternatively, RNG 310d is of a hybrid linear-feedback shift register (LFSR) and CASR—or "LFSR/CASR"—type. However, the particular number and types of RNGs 310a, 310b, 310c, 310d is merely illustrative, and device 300 comprise more, fewer and/or one or more different types of URNGs, in other embodiments.

Functionality of transform circuitry 130 is provided with Hadamard transform circuitry 330 and, in some embodiments, with circuitry of device 300 including (for example) some or all of one or more transform circuits 350, multiplex circuitry 360, fixed point generator 370, floating point generator 380, and multiplex circuitry 390. In various embodiment, device 300 alternatively omits one or more transform circuits 350 and/or omits fixed point generator 370, floating point generator 380, and multiplex circuitry 390 (for example).

A controller 340 of device 300 provides functionality to selectively provide any of various modes of device 300—e.g., wherein controller 340 corresponds functionally to controller 140. For example, controller 340 is coupled to receive via a signal 342 information which specifies or otherwise indicates criteria which a consumer of random numbers requires. Based on signal 342, controller 340 performs a search of reference information 344 (e.g., in a table, linked list or other suitable data structure) or otherwise performs operations to determine a mode of device 300 which is sufficient to accommodate said criteria. In one such embodiment, reference information 344 indicates a correspondence of various modes Ma, Mb, . . . , etc. of device 300 each with a respective requirement set {Pya}, {Pyb}, . . . , etc.—e.g., where each such mode is identified as being sufficient to satisfy the respective one or more required characteristics of the corresponding requirement set.

Based on signal 342, controller 340 generates one or more control signals (e.g., including the illustrative control signals 346, 347, 348 shown) to provide a mode of random number generation which is sufficient to accommodate the indicated criteria. In an example embodiment, control signal 346 configures a selection of one or more inputs to be received each from a respective one of RNGs 310a, 310b, 310c, 310d. Additionally or alternatively, control signal 346 configures one or more calculations to be performed with selector/calculator circuitry 320 based on the selected one or more inputs. The configuration of selector/calculator circuitry 320 by control signal 346 results in operations that generate signals 322 which (for example) represents uniformly distributed random numbers. The signals 322 are provided to Hadamard transform circuitry 330 and, in some embodiments, to multiplex circuitry 360.

The Hadamard transform circuitry 330 performs a Hadamard transform of random numbers which are represented by signals 322. The transform generates signals 332 which represent other random numbers that (in this example embodiment) have a normal distribution. Although some embodiments are not limited in this regard, signals 332 is further provided (for example) to one or more transform circuits 350 for one or more additional transforms to generate additional signals 352 representing random numbers having still another distribution. In some embodiments, control signal 346 or other control signaling (not shown) is further provided to configure one of multiple possible Hadamard transforms that can be performed with Hadamard transform circuitry 330.

In the example embodiment shown, multiplex circuitry 360 receives some or all of signals 322, signals 322, and signals 352—e.g., wherein control signal 347 configures a selection of particular ones of the signals received by multiplex circuitry 360. The selected signals 362 are provided, for example, to each of fixed point generator 370 and floating point generator 380, which generate (respectively) signals 372 representing a fixed point version of random numbers, and signals 382 representing a floating point version of said random numbers. In one such embodiment, multiplex circuitry 390 receives signals 372 and signals 382—e.g., wherein control signal 348 configures a selection of either signals 372 or signals 382 to be output as signals 392 which represent random numbers according to the criteria indicated by signal 342.

Figure 4A:
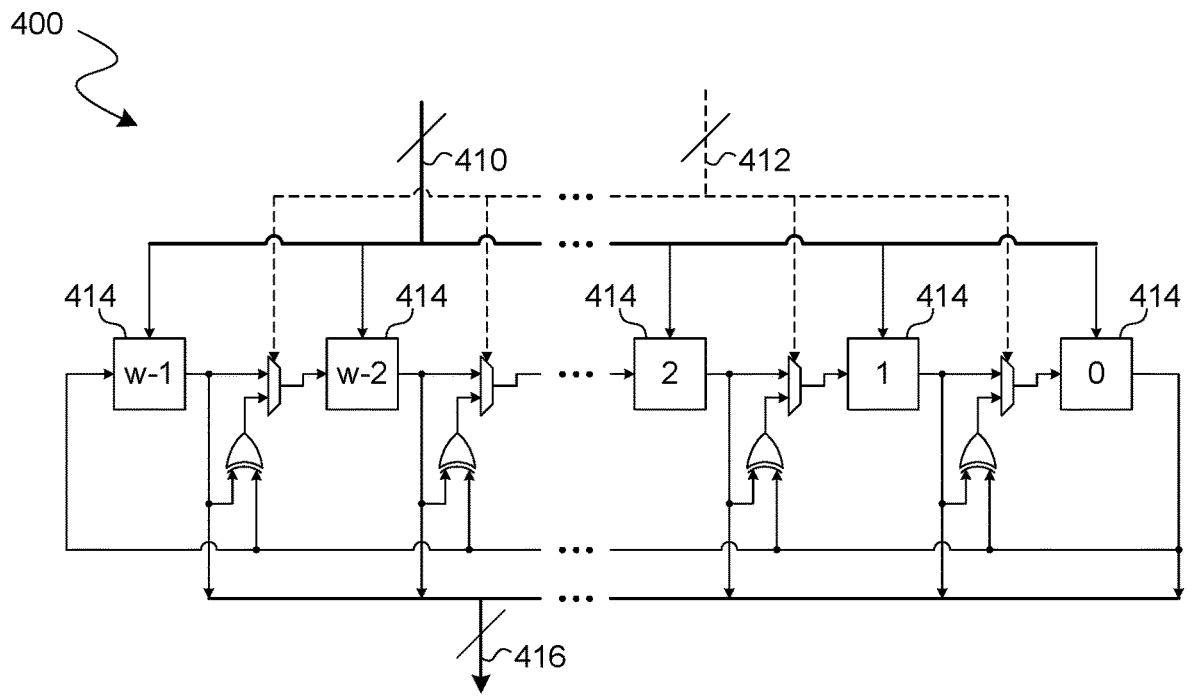
FIGS. 4A through 4C illustrate functional block diagrams each showing respective features of a circuit to generate a random number according to a corresponding embodiment.
Figure 4B:
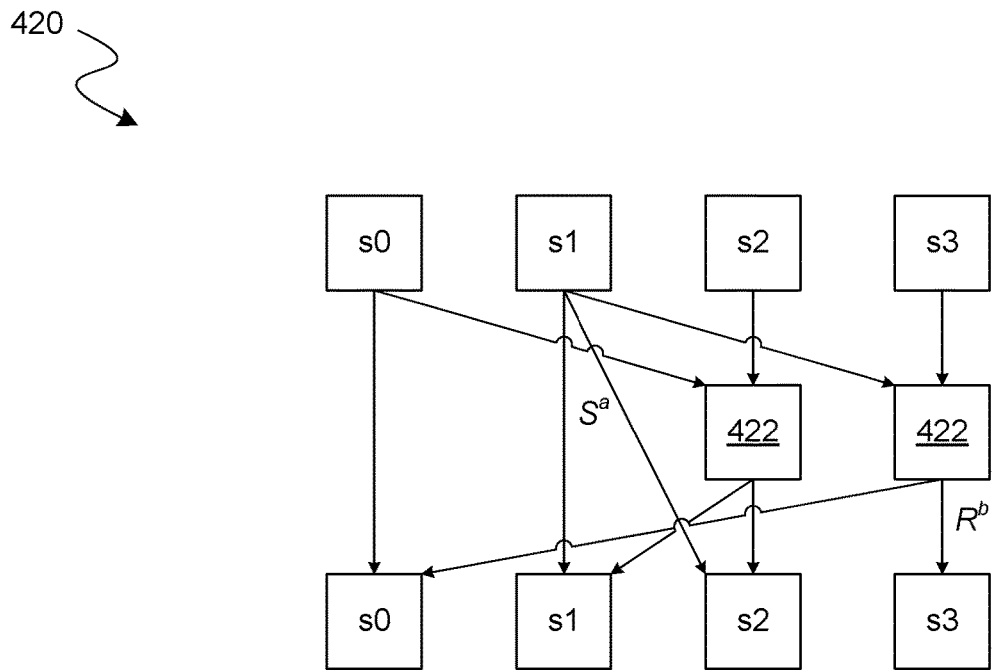
Figure 4C:
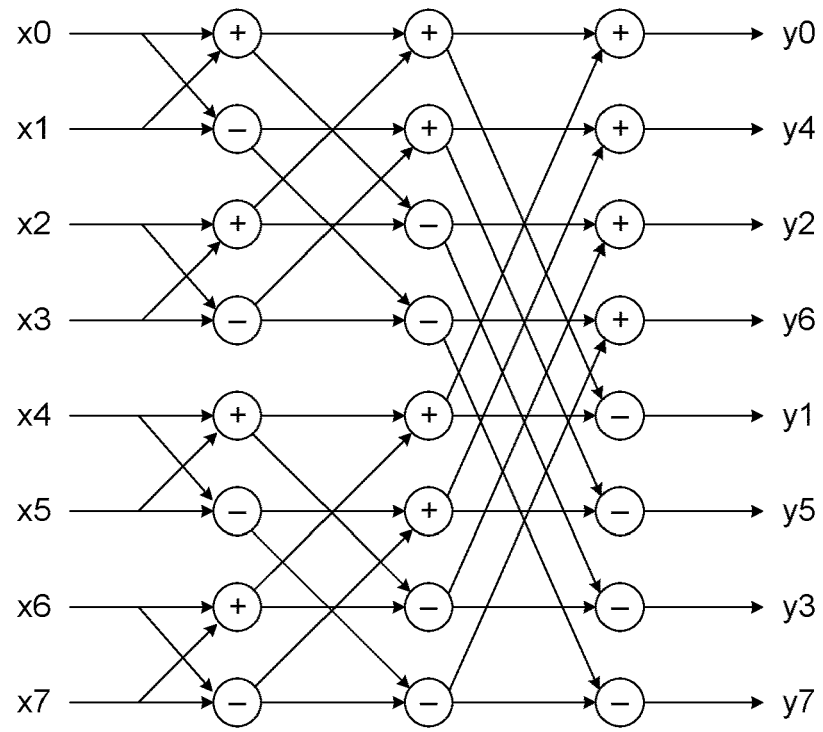

FIGS. 4A-4C show respective RNG circuits 400, 420, 440 each to facilitate a respective configurable mode of random number generation according to a corresponding embodiment. In various embodiments, one or each of RNG circuits 400, 420 include features of a respective one of URNGs 110a, . . . , 110n—e.g., wherein one or more operations of method 200 are performed with RNG circuit 400.

In FIG. 4A, RNG circuit 400 illustrates a LFSR/CASR type of RNG (such as LFSR/CASR RNG 310d). The LFSR of RNG circuit 400 comprises an in-series arrangement of blocks 414 which are each to receive a respective one of values 410 to provide an initialization state for random number generation. RNG circuit 400 is further coupled to receive a polynomial 412 representing tap information which is to determine the shifting of values into various ones of the blocks 414. Operation of RNG circuit 400 results in the generation of bits 416 to represent a random number—e.g., wherein a plurality of such random numbers, sequentially generated by RNG circuit 400, have a uniform distribution.

In FIG. 4B, RNG circuit 420 illustrates a Xoroshiro type of RNG, such as Xoroshiro RNG 310*a*. RNG circuit 420 is operable to perform a 256-bit type of Xoroshiro number generation—e.g., wherein shift operations, and rotate operations (with circuit blocks 422) are variously performed on 64-bit unsigned integers s0, s1, s2, s3 to implement a transformation matrix. As shown in FIGS. 4A, 4B, the LFSR/CASR and Xoroshiro techniques use fairly simple arithmetic and logical operations for generating Uniform Random numbers. Some embodiments variously facilitate the use of relatively high clock frequencies by exploiting smaller calculation paths which are associated with these relatively simple operations (e.g., XOR, shift, or the like).

In FIG. 4C, RNG circuit 440 illustrates a Hadamard transform circuit which, for example, is to implement a GRNG. In various embodiments, RNG circuit 440 provides functionality of transform circuitry 130 or Hadamard transform circuitry 330. A Hadamard transform performed with RNG circuit 440 comprises successive stages of additions and subtractions for respective pairs of inputs from a preceding stage. Such operations allow for a transform algorithm which is fast, highly regular, scalable, and simple to implement in hardware.

Figure 5:
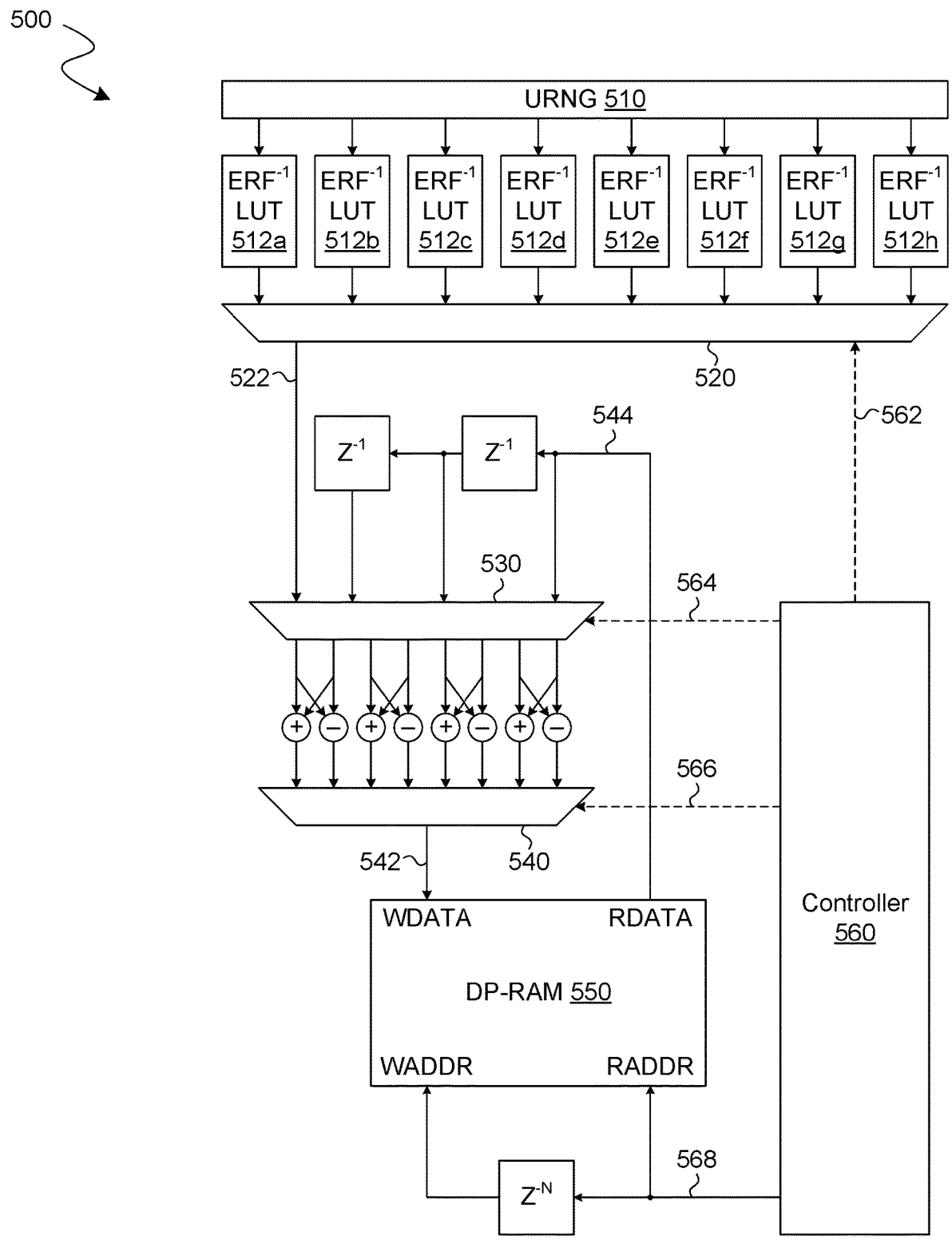
FIG. 5 illustrates a functional block diagram showing features of a device to generate random numbers according to one or more criteria according to an embodiment.

FIG. 5 shows features of a device 500 to generate random numbers having a Gaussian (normal) distribution according to an embodiment. Device 500 is one example of an embodiment wherein uniformly distributed random numbers are transformed using a (re)configurable Hadamard transform circuit. In various embodiments, device 500 includes features of transform circuitry 130, or Hadamard transform circuitry 330—e.g., wherein one or more operations of method 200 are performed with device 500.

As shown in FIG. 5, device 500 comprises a URNG 510 which successively generates random number vectors. In various embodiments, URNG 510 is implemented (for example) by selection of, and calculation with, one or more outputs each from a different respective one of URNGs 110*a*, . . . , 110*n*. For a given one such random number vector from URNG 510, bits of the vector are provided each to a different respective one of blocks 512*a*-512*h* that are to variously perform respective inverse error function (and/or other) operations based on said bits. Inverse look-up-table (LUT) functionality of blocks 512*a*-512*h*—which is optional in some embodiments—facilitates improved accuracy with a fewer number of stages, for example.

Selector circuitry 520 of device 500 is operable, responsive to a control signal 562 from a controller 560, to output signals 522 which are selected from among the respective outputs of blocks 512*a* through 512*h*. Signals 522 are provided to Hadamard transform circuitry comprising (for example) selector circuitry 530, selector circuitry 540, and a dual-port RAM 550, which are variously controlled by control signals 564, 566, 568 (respectively) from controller 560.

In one such embodiment, dual-port RAM 550 comprises an input port WDATA to receive from selector circuitry 540 data 542 which is to be written to memory resources of dual-port RAM 550. Furthermore, dual-port RAM 550 comprises an output port RDATA to provide data 544 which has been read from said memory resources. Writes to, and reads from, such memory resources are indicated by address information which is variously provided via control signal 568 to a write address input WADDR and a read address input RADDR. Such a Hadamard transform circuit (referred to as a "time interleaved" Hadamard transform circuit) enables multiple iterations which results in device 500 writing to dual-port RAM 550 a random number which is based on the signals 522 from selector circuitry 520—e.g., wherein the number of iterations and/or the length of a given one such iteration is configurable to accommodate some criteria according to which random numbers are to be generated.

Figure 6:
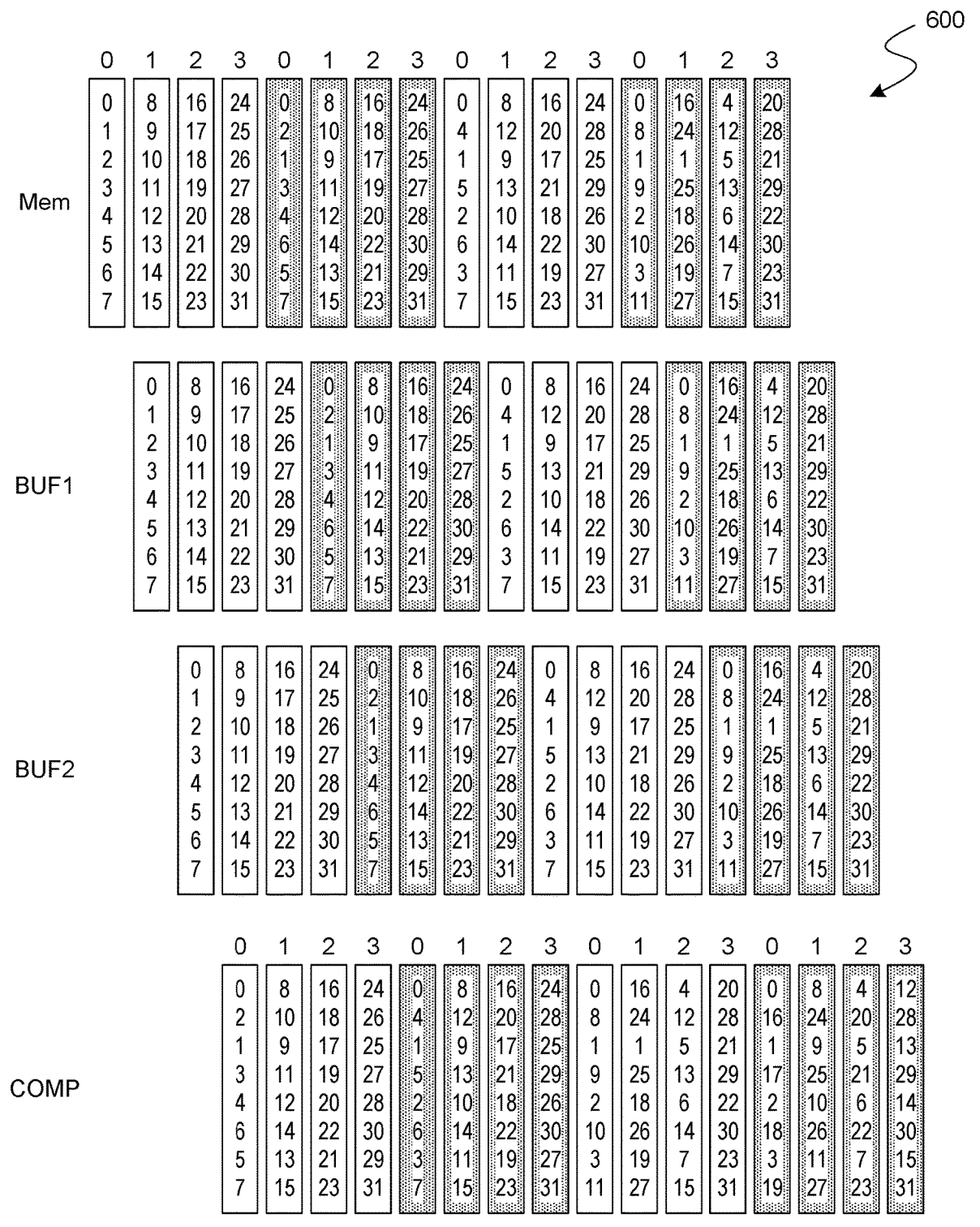

FIG. 6 shows a timing diagram 600 illustrating a 32-point Hadamard transform which is performed by device 500 according to one embodiment. In timing diagram 600, memory elements are labeled from 0 to 31—indicating their correspondence to respective input index values—to show how the memory elements are variously shuffled during such a Hadamard transform.

In timing diagram 600, one iteration of processing for all 32 elements is performed (for example) over four clock cycles, where four such iterations are shown as being performed successively. In FIG. 6, the label "MEM" represents memory elements being communicated as data 544 read from the output port RDATA of dual-port RAM 550. Furthermore, the labels "BUF1" and "BUF2" each represent a different respective one of the two buffers which each provide a respective delay of one clock cycle (as indicated by the label "$Z^{-1}$"). Further still, the label "COMP" represents the data 542 communicated from selector circuitry 540 for writing to dual-port RAM 550

In various embodiments, a transform such as that provided with device 500 is configurable to provide any of various transform lengths, sizes, and/or bit widths (for example). By way of illustration and not limitation, device 500 could be configured to run a 32-point (size) Hadamard transform for 5 iterations (length) to provide a full 32-point transform. Alternatively or in addition, the same device 500 could instead be configured—e.g., at a different time—to perform Hadamard transform processing which runs for only three iterations to produce four 8-point transforms. In various embodiments, if the memory bus width of dual-port RAM 550 is 128-bits (for example), a SIMD adder in the data path could be configured to interpret a 128-bit value as eight 16-bit numbers, as four 32-bit numbers, or the like.

Generally, reducing the length of a transform enables increased overall throughput. Similarly, lower bit widths tend to enable increased throughput. However, lower bit width usually sacrifices various statistical properties, including an ability to represent Gaussian numbers to a certain level of sigma. Similarly, shortening the size of a Hadamard transform tends to lower statistical randomness generated. Some embodiments variously improved on existing RNG architectures by enabling an efficient tuning of transform size, length, bit width, and/or other characteristics—e.g., to accommodate a balance between throughput and statistical properties according to one or more software (or other) criteria.

Figure 7:
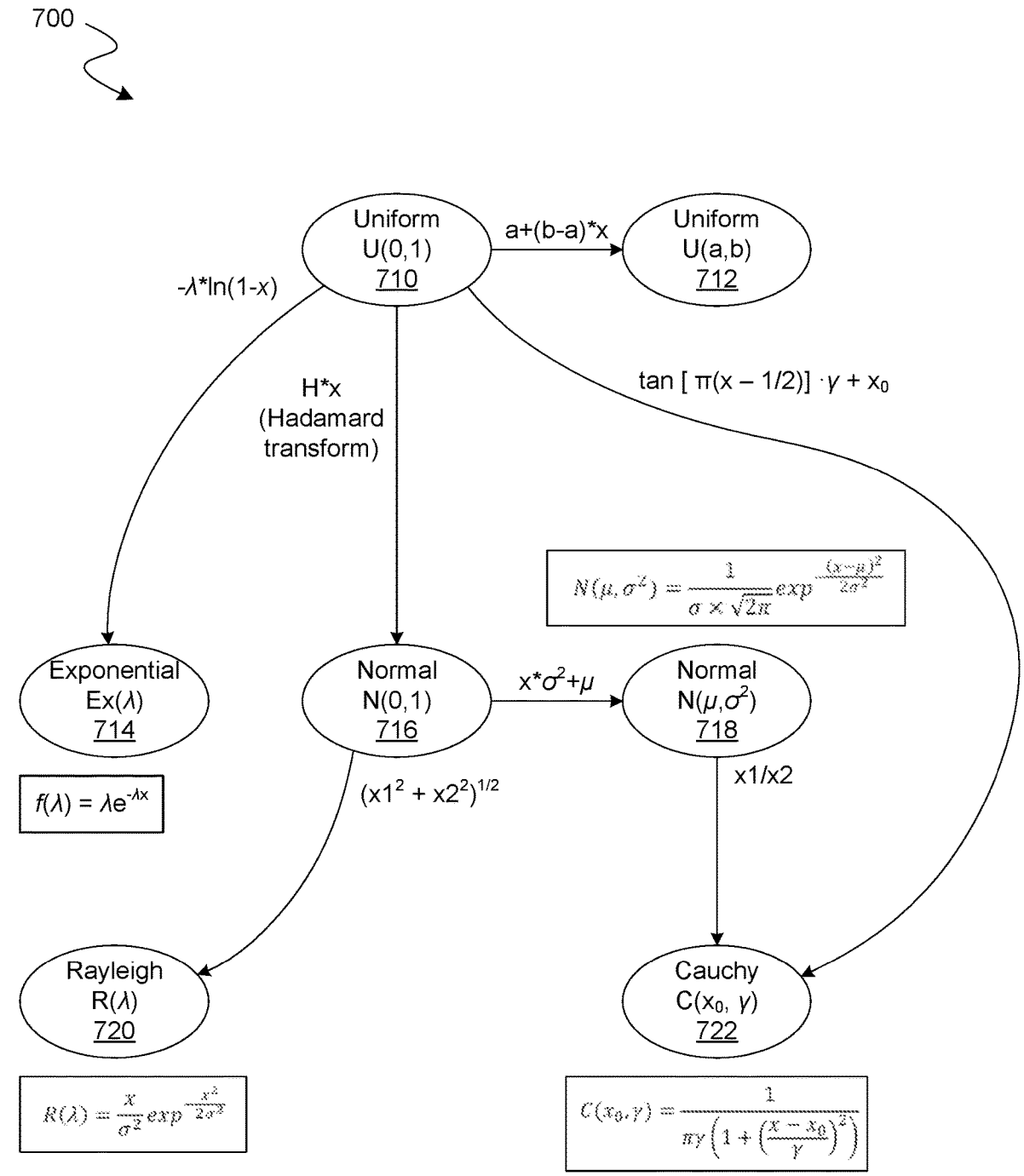
FIG. 7 illustrates a transform diagram showing operations to perform a transformation of random number information according to an embodiment.

FIG. 7 shows a transform diagram 700 illustrating various transformations to generate random numbers according to an embodiment. For example, one or more transformations represented in transform diagram 700—each from a respective first distribution of first random numbers to a respective second distribution of second random numbers—is performed with circuitry which provides functionality such as that of device 100 or device 300. Alternatively a given one of such transformations is provided (for example) with some or all operations of method 200. Some embodiments variously provide a transformation—such as one in transform diagram 700—with circuitry which is (re)configurable to provide a modular scalability of one or more statistical properties and/or one or more performance properties of random number generation.

As shown in FIG. 7, transform diagram 700 comprises a state 710 which represents a uniform distribution U(0,1) in an interval (0,1)—e.g., wherein another state 712 represents a different uniform distribution U(a,b) in an interval (a,b) between respective numbers a, b. Furthermore, transform diagram 700 comprises a state 714 which represents an exponential distribution E(x,λ), wherein a state 716 represents a normal (Gaussian) distribution N(0,1) in the interval (0,1), and a state 718 represents another normal distribution N(μ,σ²). Further still, transform diagram 700 comprises a state 720 which represents a Rayleigh distribution R(λ), wherein state 722 represents a Cauchy distribution C($x_0$,γ).

The arrows shown in transform diagram 700 each indicate a respective transformation between two distribution states (e.g., where the transformation is according to the corresponding formula shown with said arrow). The boxes variously shown in FIG. 7 each illustrate a respective probability function for the corresponding distribution state. As indicated, various ones of the distributions states are derived each with a respective single-step type of transformation—e.g., using one of a natural log(log e), a division, a sqrt, or a tangent operation.

Figure 8:
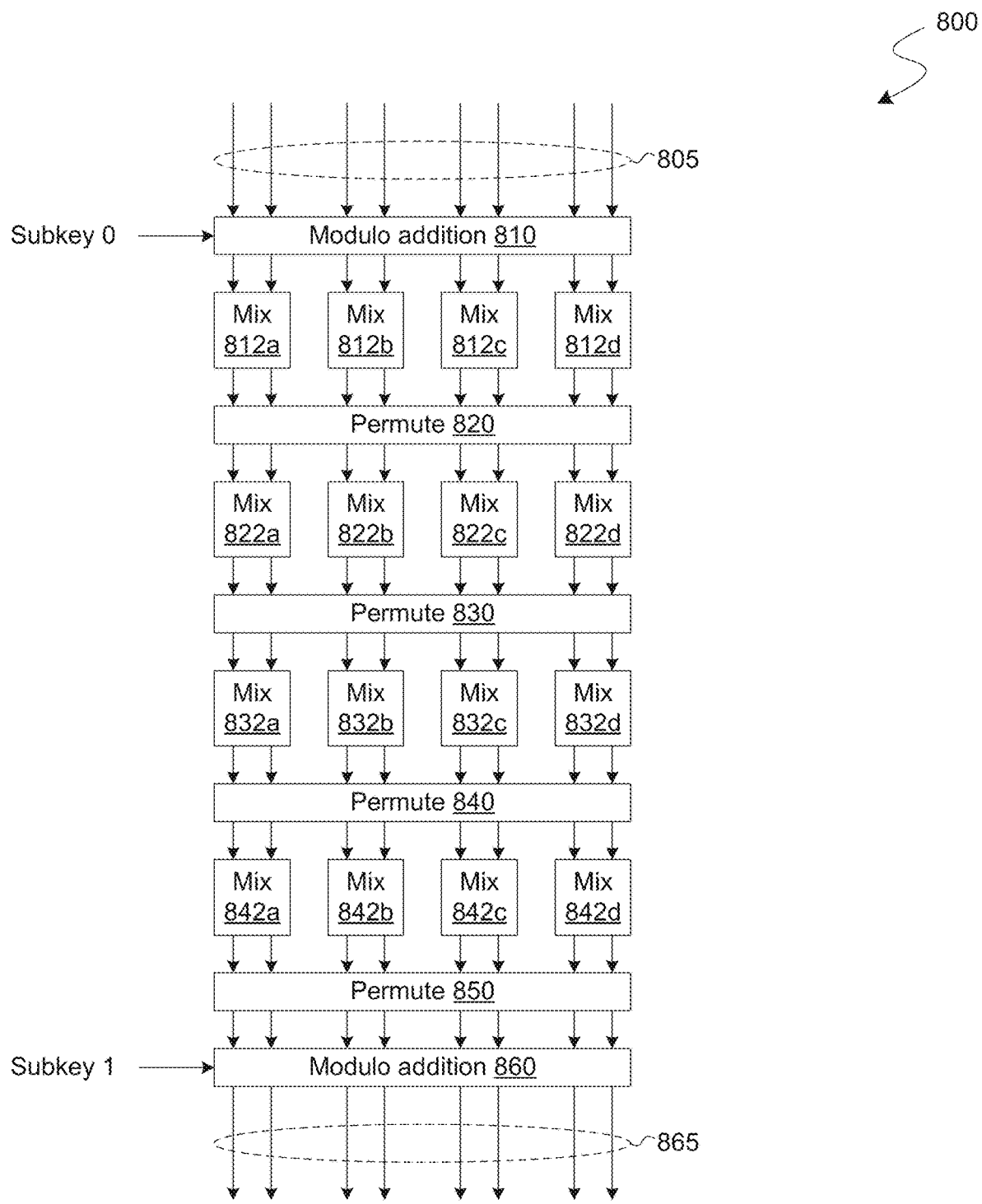
FIG. 8 illustrates a functional block diagram showing features of a block cipher to generate facilitate random number generation according to an embodiment.

FIG. 8 is block diagram showing features of a tweakable Threefish block cipher 800 to facilitate random number generation according to an embodiment. Block cipher 800 uses modulo additions and XORs, combined with block-level permutations, to efficiently achieve quick diffusion and provide non-linearity in a hashing function. In various embodiments, the statistical characteristics of a cryptographic RNG (CRNGs) such as one comprising block cipher 800 are indistinguishable from those of a true RNG (TRNG)—e.g., in contrast to a relatively predictable LCG. For example, such a CRNG is adaptable to satisfy a "next-bit" test criteria wherein, given k observations of the output of a given RNG, there exists no polynomial-time algorithm that can predict the k+1th element of the sequence. Alternatively or in addition, such a CRNG satisfies a "state compromise extension" test criteria wherein it is not possible, given only the state of the RNG at a time k, to reconstruct the complete past history of the RNG's output.

As shown in FIG. 8, block cipher 800 comprises modulo addition blocks 810, 860, and a sequential arrangement of permute blocks 820, 830, 840, 850 between modulo addition blocks 810, 860. Modulo addition block 810 is coupled to receive a plaintext input 805, which is subjected to modulo addition operations with a subkey 0. For example, the plaintext 805 is generated based on a selected one or more inputs each from a different respective uniform RNG—e.g., where the one or more transform circuits 350 comprises block cipher 800.

Based on a result of operations at addition block 810, alternating stages of mix processing and permute processing are performed sequentially by block cipher 800. A given one of the mix stages transforms a respective two data words with a single addition, rotation by a constant, and XOR process. A given one of the permute stages swaps the positions of a respective two words according to a predetermined pattern.

For example, a first mix stage, between addition block 810 and permute block 820, is performed with mix blocks 812a through 812d—e.g., wherein a second mix stage, between permute blocks 820, 830, is performed with blocks 822a through 822d. Furthermore, a third mix stage, between permute blocks 830, 840, is performed with blocks 832a through 832d—e.g., wherein a fourth mix stage, between permute blocks 840, 850, is performed with blocks 842a through 842d. A result of processing at permute block 850 is received by modulo addition block 860, where it is subjected to modulo addition operations with a subkey 1 to generate cryptographic output 865.

To mitigate a susceptibility of block cipher 800 to rotational cryptanalysis, rebound and boomerang attacks, etc. some embodiments provide an entropy pool of subkeys—e.g., from a TRNG. In one such embodiment, the keys are periodically refreshed, mixed, swapped, or permuted—e.g., at (pseudo)random intervals.

The figures described herein detail exemplary architectures and systems to implement embodiments of the above. In some embodiments, one or more hardware components and/or instructions described herein are emulated as detailed below, or implemented as software modules.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 10A:
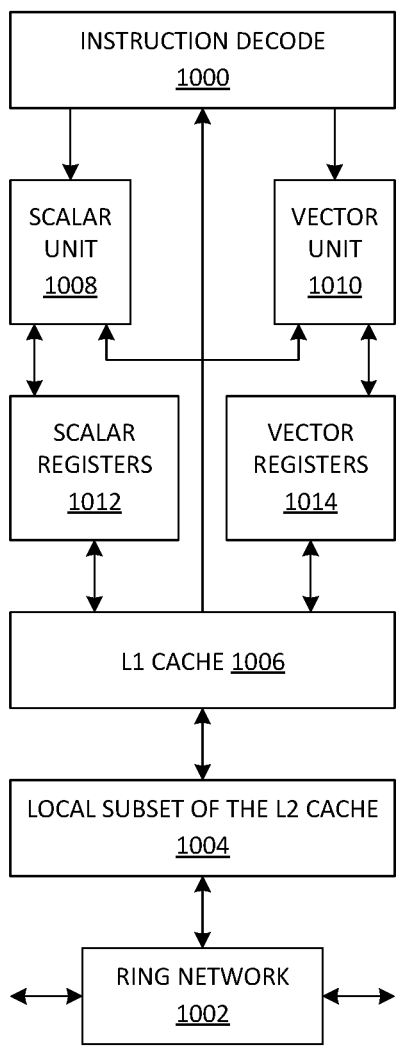
FIGS. 10A through 10B illustrate a block diagram of a more specific exemplary in-order core architecture, which core would be one of several logic blocks (including other cores of the same type and/or different types) in a chip.
Figure 10B:
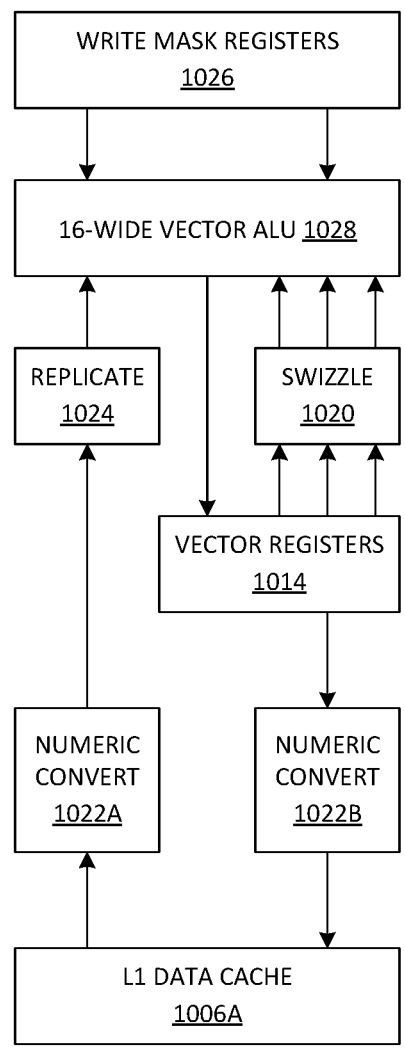

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the invention. FIG. 10B includes an L1 data cache 1006A part of the L1 cache 1006, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 11:
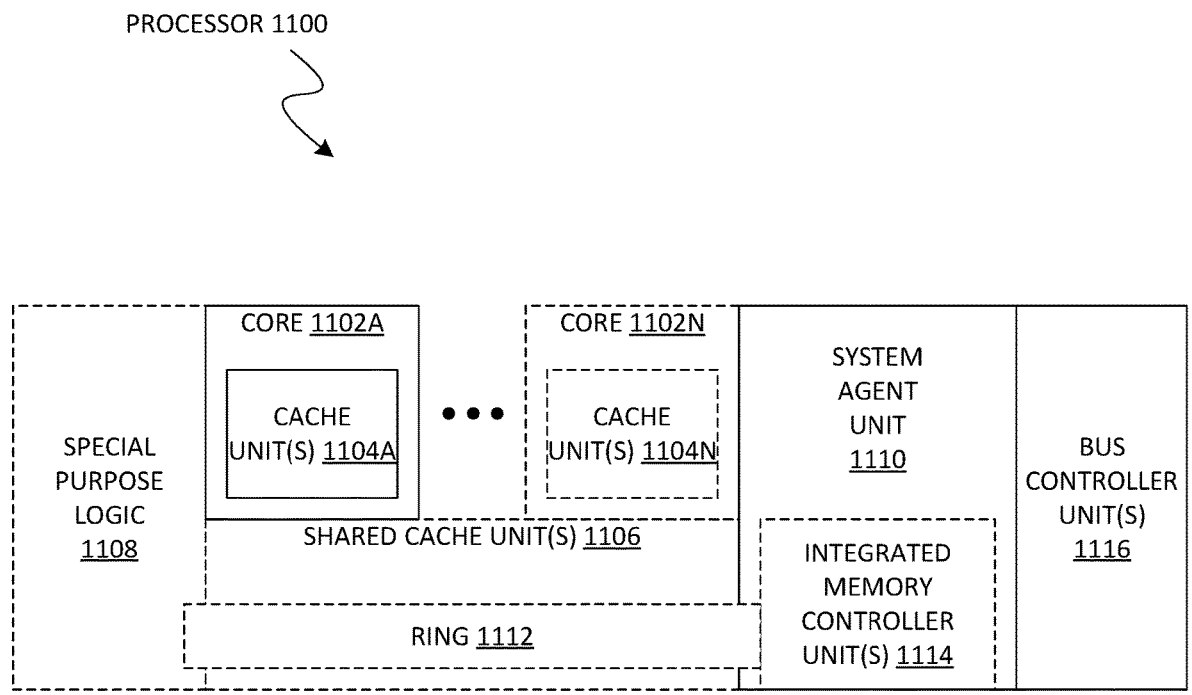
FIG. 11 is a block diagram of a processor that may have more than one core, may have an integrated memory controller, and may have integrated graphics according to an embodiment.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes respective one or more levels of caches 1104A-N within cores 1102A-N, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the special purpose logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12 through 15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
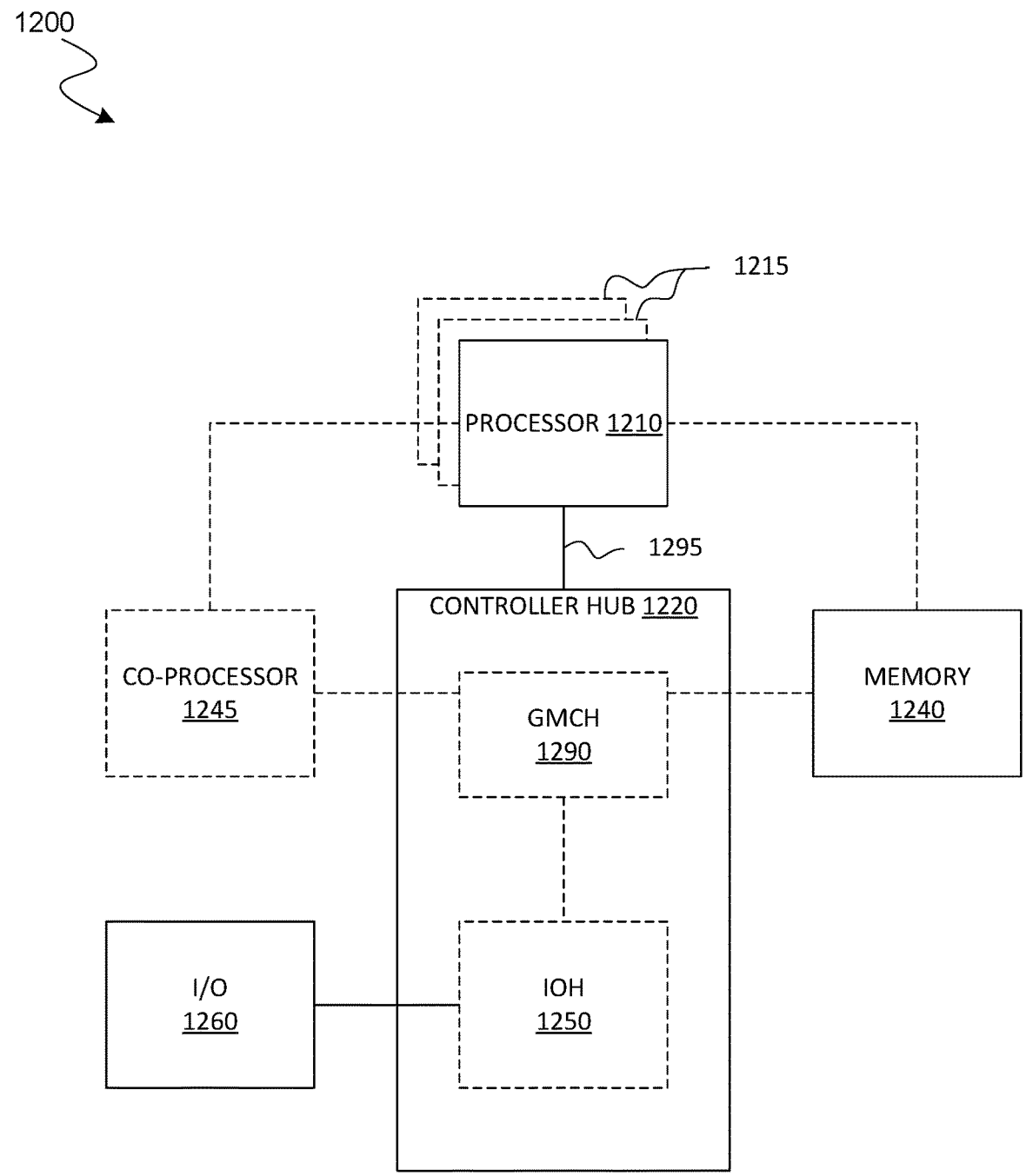
FIGS. 12 through 15 are block diagrams of exemplary computer architectures.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the processors 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
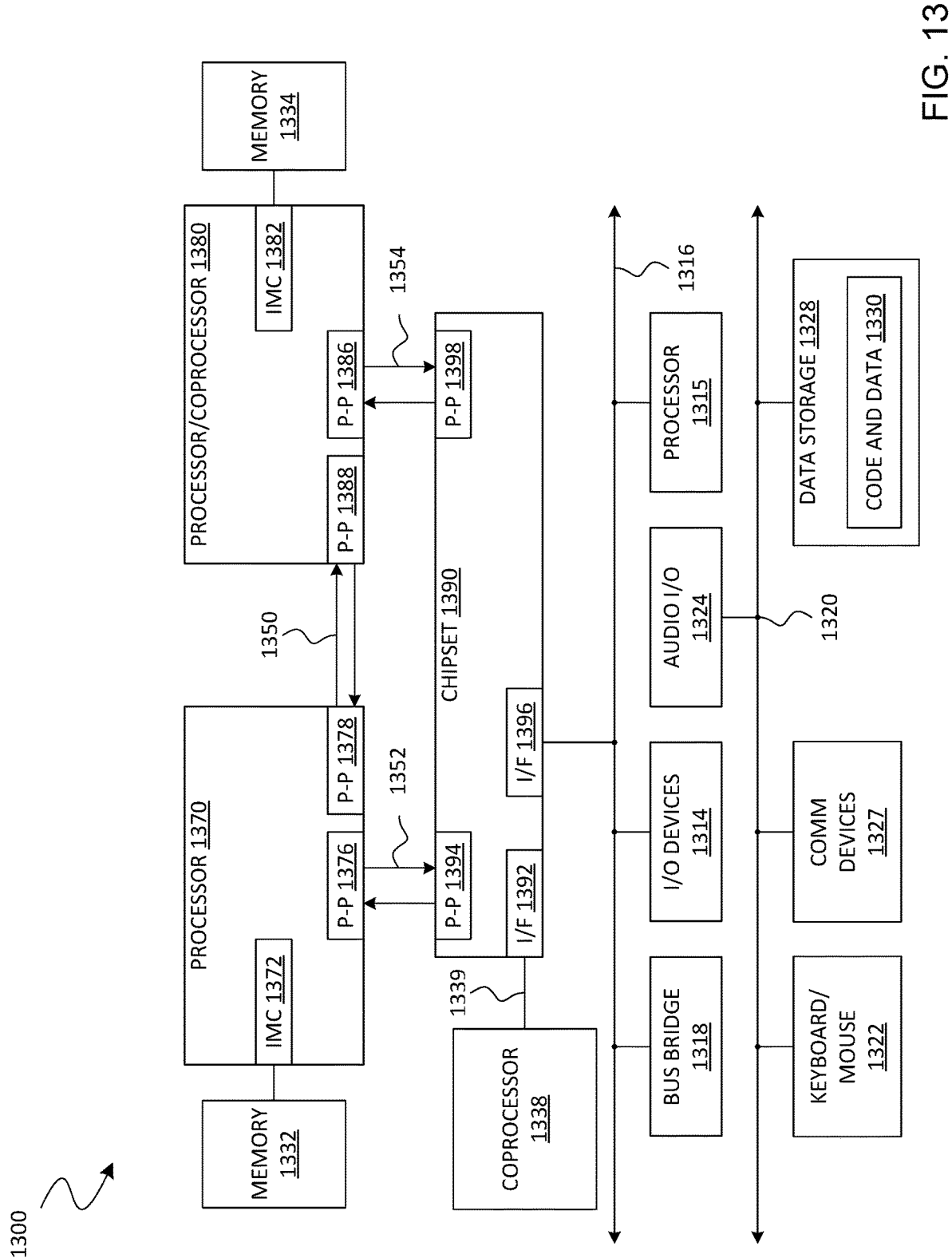

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller unit's point-to-point (P-P) interfaces 1376 and 1378; similarly, second processor 1380 includes P-P interfaces 1386 and 1388. Processors 1370, 1380 may exchange information via a point-to-point (P-P) interconnect 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1392 and an interconnect 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
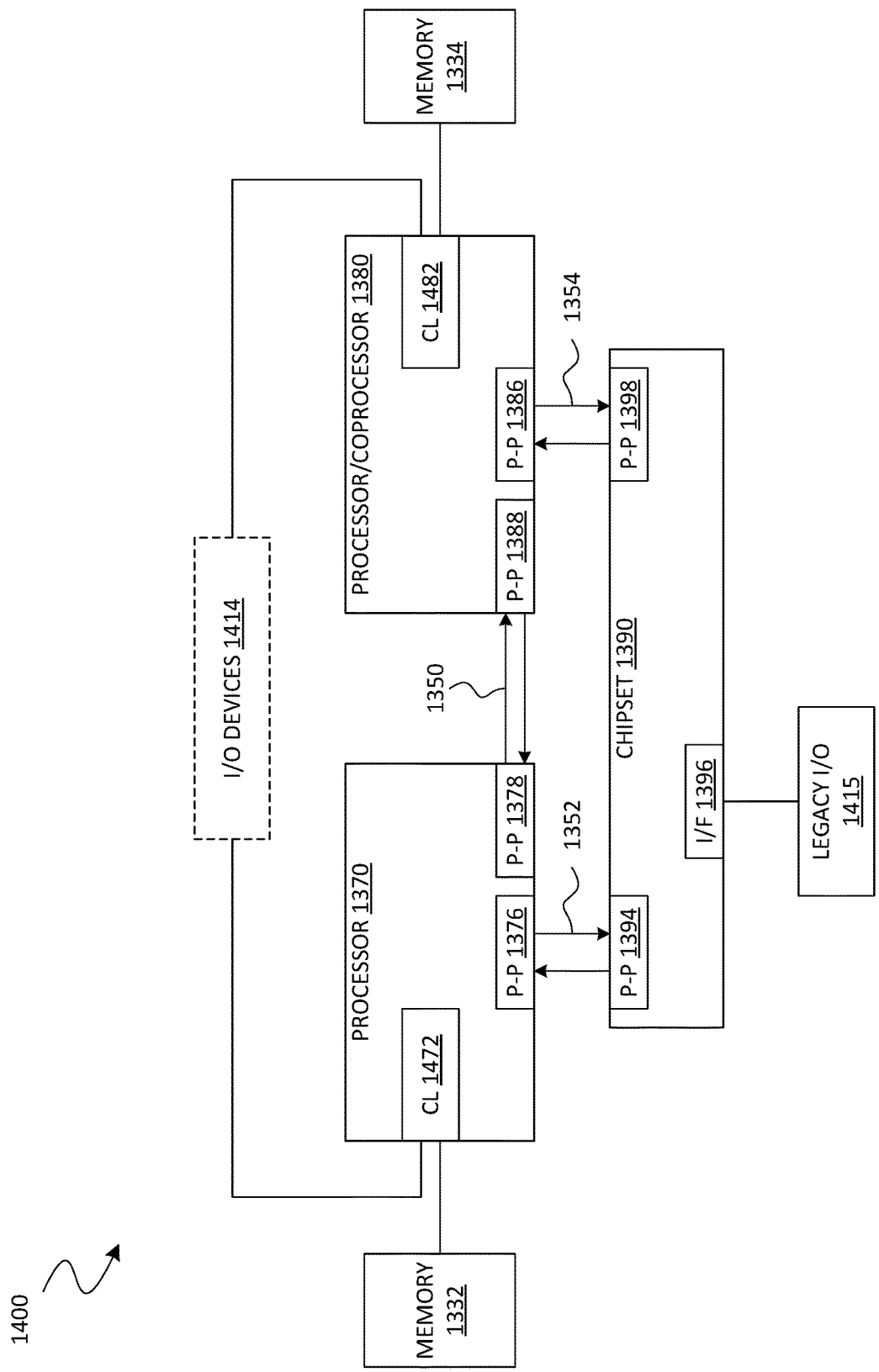

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1472 and 1482, respectively. Thus, the CL 1472, 1482 include integrated memory controller units and include I/O control logic. FIG. 14 illustrates that not only are the memories 1332, 1334 coupled to the CL 1472, 1482, but also that I/O devices 1414 are also coupled to the control logic 1472, 1482. Legacy I/O devices 1415 are coupled to the chipset 1390.

Figure 15:
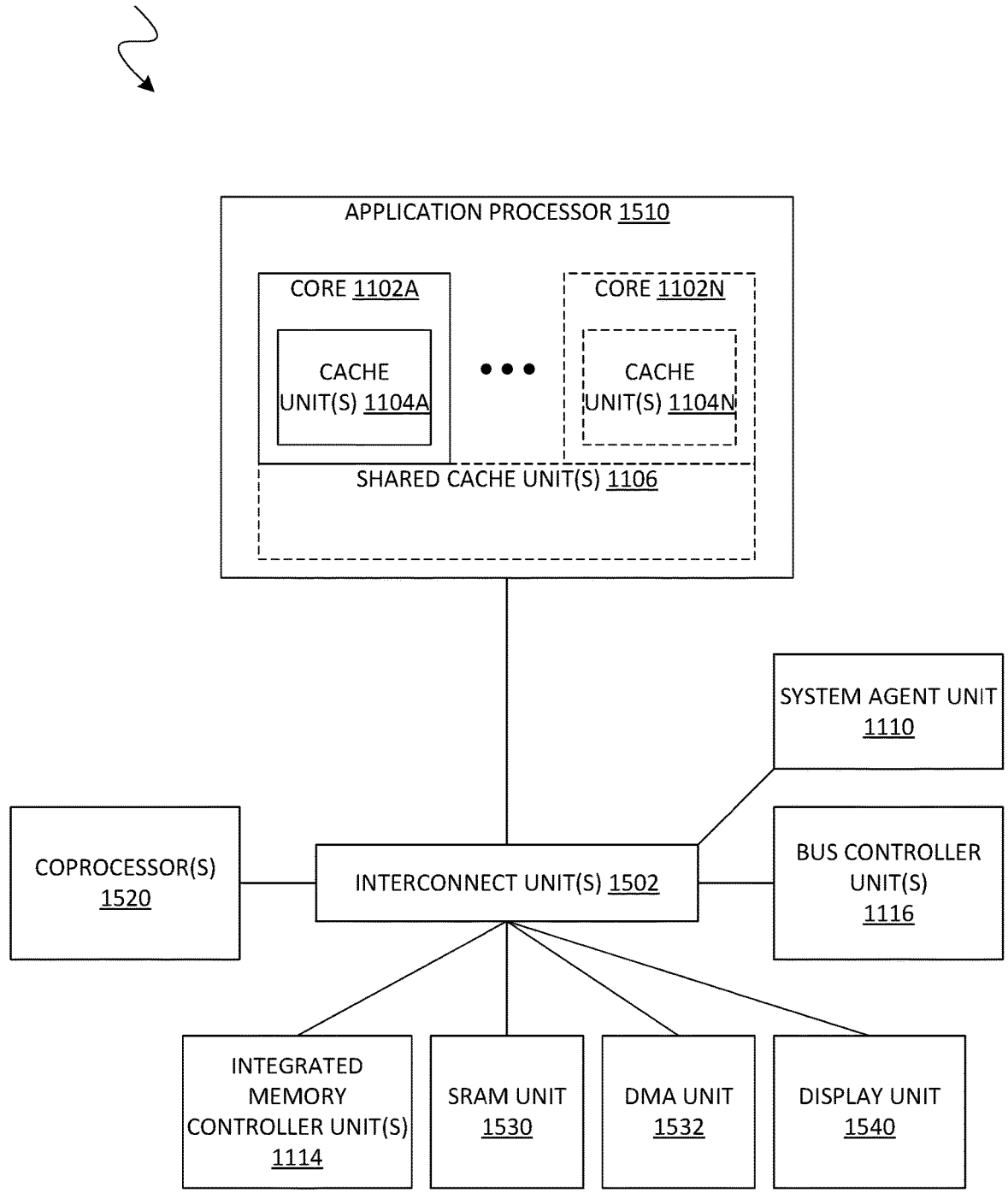

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 1102A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
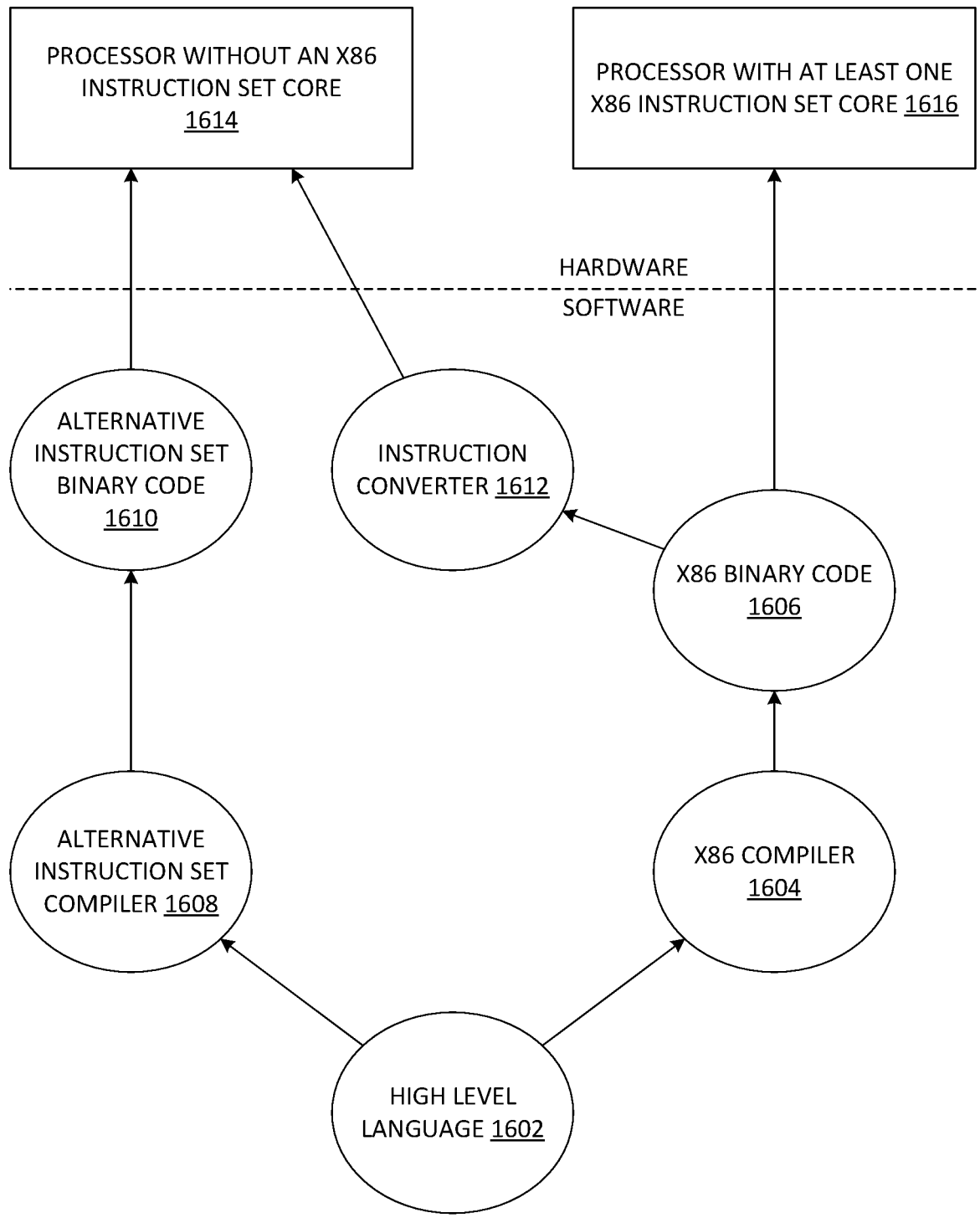
FIG. 16 is a block diagram contrasting the use of a software instruction converter to convert binary instructions in a source instruction set to binary instructions in a target instruction set according to an embodiment.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, CA and/or that execute the ARM instruction set of ARM Holdings of Sunnyvale, CA). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

In one or more first embodiments, a device comprises a first random number generator (RNG) circuit, multiple RNG circuits, first circuitry coupled between the first RNG circuit and the multiple RNG circuits, and second circuitry, coupled to the first circuitry, to receive an indication of a criteria to be applied to a generation of one or more random numbers, wherein, based on the indication, the second circuitry is to determine that the criteria corresponds to a mode of the device, and generate one or more control signals to provide the mode with the first circuitry, wherein, based on the one or more control signals, the first circuitry is to to select one or more RNG circuits from among the multiple RNG circuits, to receive one or more inputs each from a respective one of the one or more RNG circuits, and to calculate the one or more random numbers based on the one or more inputs.

In one or more second embodiments, further to the first embodiment, the first RNG circuit is to generate first random numbers with a first distribution, and for each of the multiple RNG circuits the each RNG circuit is to generate a respective second random numbers, wherein a distribution of the respective second random numbers is more uniform than a distribution of the first distribution.

In one or more third embodiments, further to the first embodiment or the second embodiment, the first RNG circuit comprises a Gaussian RNG circuit.

In one or more fourth embodiments, further to the third embodiment, the Gaussian RNG comprises a Hadamard transform circuit.

In one or more fifth embodiments, further to any of the first through second embodiments, the multiple RNG circuits comprise one of an xoroshiro RNG circuit, a Tiny Mersenne Twister (TinyMT) RNG circuit, or a linear feedback shift register and cellular automata shift register (LFSR/CASR) RNG circuit.

In one or more sixth embodiments, further to any of the first through second embodiments, the device further comprises third circuitry coupled to receive respective signals from each of the first RNG circuit and the multiple RNG circuits, wherein the second circuitry is to generate the one or more control signals to provide the mode further with the third circuitry, and wherein, based on the one or more control signals, the third circuitry is to select multiple ones of the respective signals from each of the first RNG circuit and the multiple RNG circuits.

In one or more seventh embodiments, further to any of the first through second embodiments, the device further comprises third circuitry coupled to receive signals based on an output from the first RNG circuit, wherein the second circuitry is to generate the one or more control signals to provide the mode further with the third circuitry, and wherein, based on the one or more control signals, the third circuitry is to select between generating a fixed point value based on the signals, and generating a floating point value based on the signals.

In one or more eighth embodiments, further to any of the first through second embodiments, the second circuitry is further to receive a second indication of a second criteria to be applied to a generation of a second one or more random numbers, wherein, based on the second indication, the second circuitry is to determine that the second criteria corresponds to a second mode of the device, and generate a second one or more control signals to provide the second mode with the first circuitry, wherein, based on the second one or more control signals, the first circuitry is to to select a second one or more RNG circuits from among the multiple RNG circuits, to receive a second one or more inputs each from a respective one of the second one or more RNG circuits, and to calculate the second one or more random numbers based on the second one or more inputs.

In one or more ninth embodiments, a method comprises receiving an indication of a criteria to be applied to a generation of one or more random numbers, based on the indication determining that the criteria corresponds to a mode of a device comprising a first random number generator (RNG) circuit, multiple RNG circuits, and first circuitry coupled between the first RNG circuit and the multiple RNG circuits, and generating one or more control signals to provide the mode with the first circuitry, and with the first circuitry, based on the one or more control signals selecting one or more RNG circuits from among the multiple RNG circuits, receiving one or more inputs each from a respective one of the one or more RNG circuits, and calculating the one or more random numbers based on the one or more inputs.

In one or more tenth embodiments, further to the ninth embodiment, the first RNG circuit generates first random numbers with a first distribution, and for each of the multiple RNG circuits the each RNG circuit generates a respective second random numbers, wherein a distribution of the respective second random numbers is more uniform than a distribution of the first distribution.

In one or more eleventh embodiments, further to the ninth embodiment or the tenth embodiment, the first RNG circuit comprises a Gaussian RNG circuit.

In one or more twelfth embodiments, further to the eleventh embodiment, the Gaussian RNG comprises a Hadamard transform circuit.

In one or more thirteenth embodiments, further to any of the ninth through tenth embodiments, the multiple RNG circuits comprise one of an xoroshiro RNG circuit, a Tiny Mersenne Twister (TinyMT) RNG circuit, or a linear feedback shift register and cellular automata shift register (LFSR/CASR) RNG circuit.

In one or more fourteenth embodiments, further to any of the ninth through tenth embodiments, the method further comprises receiving, at second circuitry of the device, respective signals from each of the first RNG circuit and the multiple RNG circuits, wherein generating the one or more control signals is to provide the mode further with the second circuitry, and with the second circuitry, based on the one or more control signals, selecting multiple ones of the respective signals from each of the first RNG circuit and the multiple RNG circuits.

In one or more fifteenth embodiments, further to any of the ninth through tenth embodiments, the method further comprises receiving, at second circuitry of the device, signals based on an output from the first RNG circuit, wherein generating the one or more control signals is to provide the mode further with the second circuitry, and with the second circuitry, based on the one or more control signals, selecting between generating a fixed point value based on the signals, and generating a floating point value based on the signals.

In one or more sixteenth embodiments, further to any of the ninth through tenth embodiments, the method further comprises receiving a second indication of a second criteria to be applied to a generation of a second one or more random numbers, based on the second indication determining that the second criteria corresponds to a second mode of the device, and generating a second one or more control signals to provide the second mode with the first circuitry, with the first circuitry, based on the second one or more control signals selecting a second one or more RNG circuits from among the multiple RNG circuits, receiving a second one or more inputs each from a respective one of the second one or more RNG circuits, and calculating the second one or more random numbers based on the second one or more inputs.

In one or more seventeenth embodiments, a system comprises a packaged device comprising a first random number generator (RNG) circuit, multiple RNG circuits, first circuitry coupled between the first RNG circuit and the multiple RNG circuits, and second circuitry, coupled to the first circuitry, to receive an indication of a criteria to be applied to a generation of one or more random numbers, wherein, based on the indication, the second circuitry is to determine that the criteria corresponds to a mode of the packaged device, and generate one or more control signals to provide the mode with the first circuitry, wherein, based on the one or more control signals, the first circuitry is to to select one or more RNG circuits from among the multiple RNG circuits, to receive one or more inputs each from a respective one of the one or more RNG circuits, and to calculate the one or more random numbers based on the one or more inputs. The system further comprises display device coupled to the packaged device, the display device to display an image based on a signal communicated with the packaged device.

In one or more eighteenth embodiments, further to the seventeenth embodiment, the first RNG circuit is to generate first random numbers with a first distribution, and for each of the multiple RNG circuits the each RNG circuit is to generate a respective second random numbers, wherein a distribution of the respective second random numbers is more uniform than a distribution of the first distribution.

In one or more nineteenth embodiments, further to the seventeenth embodiment or the eighteenth embodiment, the first RNG circuit comprises a Gaussian RNG circuit.

In one or more twentieth embodiments, further to the nineteenth embodiment, the Gaussian RNG comprises a Hadamard transform circuit.

In one or more twenty-first embodiments, further to any of the seventeenth through eighteenth embodiments, the multiple RNG circuits comprise one of an xoroshiro RNG circuit, a Tiny Mersenne Twister (TinyMT) RNG circuit, or a linear feedback shift register and cellular automata shift register (LFSR/CASR) RNG circuit.

In one or more twenty-second embodiments, further to any of the seventeenth through eighteenth embodiments, the packaged device further comprises third circuitry coupled to receive respective signals from each of the first RNG circuit and the multiple RNG circuits, wherein the second circuitry is to generate the one or more control signals to provide the mode further with the third circuitry, and wherein, based on the one or more control signals, the third circuitry is to select multiple ones of the respective signals from each of the first RNG circuit and the multiple RNG circuits.

In one or more twenty-third embodiments, further to any of the seventeenth through eighteenth embodiments, the packaged device further comprises third circuitry coupled to receive signals based on an output from the first RNG circuit, wherein the second circuitry is to generate the one or more control signals to provide the mode further with the third circuitry, and wherein, based on the one or more control signals, the third circuitry is to select between generating a fixed point value based on the signals, and generating a floating point value based on the signals.

In one or more twenty-fourth embodiments, further to any of the seventeenth through eighteenth embodiments, the second circuitry further to receive a second indication of a second criteria to be applied to a generation of a second one or more random numbers, wherein, based on the second indication, the second circuitry is to determine that the second criteria corresponds to a second mode of the packaged device, and generate a second one or more control signals to provide the second mode with the first circuitry, wherein, based on the second one or more control signals, the first circuitry is to to select a second one or more RNG circuits from among the multiple RNG circuits, to receive a second one or more inputs each from a respective one of the second one or more RNG circuits, and to calculate the second one or more random numbers based on the second one or more inputs.

Techniques and architectures for generating random numbers are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A device comprising:
a first random number generator (RNG) circuit;
multiple RNG circuits;
first circuitry coupled between the first RNG circuit and the multiple RNG circuits; and
second circuitry, coupled to the first circuitry, to receive an indication of a criteria to be applied to a generation of one or more random numbers, wherein, based on the indication, the second circuitry is to:
determine that the criteria corresponds to a first mode of the device, comprising the second circuitry to:
access reference information based on the criteria, wherein the reference information corresponds different modes of the device each with a different respective one of requirement sets which each comprise a respective one or more required characteristics of random number generation, wherein a first requirement set of the requirement sets corresponds to the first mode of the device, and wherein the first requirement set comprises a first required statistical characteristic and a first required performance characteristic; and
identify the first requirement set as a closest match to the criteria based on both the first required statistical characteristic and the first required performance characteristic; and
generate one or more control signals to provide the first mode with the first circuitry;
wherein, based on the one or more control signals, the first circuitry is to:
select one or more RNG circuits from among the multiple RNG circuits;
receive one or more inputs each from a respective one of the one or more RNG circuits; and
calculate the one or more random numbers based on the one or more inputs.

2. The device of claim 1, wherein:
the first RNG circuit is to generate first random numbers with a first distribution; and
for each of the multiple RNG circuits:
the each RNG circuit is to generate a respective second random numbers, wherein a distribution of the respective second random numbers is more uniform than a distribution of the first distribution.

3. The device of claim 1, wherein the first RNG circuit comprises a Gaussian RNG circuit.

4. The device of claim 3, wherein the Gaussian RNG comprises a Hadamard transform circuit.

5. The device of claim 1, wherein the multiple RNG circuits comprise one of:
an xoroshiro RNG circuit;
a Tiny Mersenne Twister (TinyMT) RNG circuit; or
a linear feedback shift register and cellular automata shift register (LFSR/CASR) RNG circuit.

6. The device of claim 1, further comprising third circuitry coupled to receive respective signals from each of the first RNG circuit and the multiple RNG circuits;
wherein the second circuitry is to generate the one or more control signals to provide the first mode further with the third circuitry; and
wherein, based on the one or more control signals, the third circuitry is to select multiple ones of the respective signals from each of the first RNG circuit and the multiple RNG circuits.

7. The device of claim 1, further comprising third circuitry coupled to receive signals based on an output from the first RNG circuit;
wherein the second circuitry is to generate the one or more control signals to provide the first mode further with the third circuitry; and
wherein, based on the one or more control signals, the third circuitry is to select between generating a fixed point value based on the signals, and generating a floating point value based on the signals.

8. The device of claim 1, the second circuitry further to receive a second indication of a second criteria to be applied to a generation of a second one or more random numbers, wherein, based on the second indication, the second circuitry is to:
determine that the second criteria corresponds to a second mode of the device; and
generate a second one or more control signals to provide the second mode with the first circuitry;
wherein, based on the second one or more control signals, the first circuitry is to:
select a second one or more RNG circuits from among the multiple RNG circuits;
receive a second one or more inputs each from a respective one of the second one or more RNG circuits; and
calculate the second one or more random numbers based on the second one or more inputs.

9. A method comprising:
receiving an indication of a criteria to be applied to a generation of one or more random numbers;
based on the indication:
determining that the criteria corresponds to a first mode of a device comprising a first random number generator (RNG) circuit, multiple RNG circuits, and first circuitry coupled between the first RNG circuit and the multiple RNG circuits, wherein the determining comprises:

accessing reference information based on the criteria, wherein the reference information corresponds different modes of the device each with a different respective one of requirement sets which each comprise a respective one or more required characteristics of random number generation, wherein a first requirement set of the requirement sets corresponds to the first mode of the device, and wherein the first requirement set comprises a first required statistical characteristic and a first required performance characteristic; and identify the first requirement set as a closest match to the criteria based on both the first required statistical characteristic and the first required performance characteristic; and generating one or more control signals to provide the first mode with the first circuitry; and with the first circuitry, based on the one or more control signals:

selecting one or more RNG circuits from among the multiple RNG circuits;

receiving one or more inputs each from a respective one of the one or more RNG circuits; and calculating the one or more random numbers based on the one or more inputs.

10. The method of claim 9, wherein:
the first RNG circuit generates first random numbers with a first distribution; and
for each of the multiple RNG circuits:
the each RNG circuit generates a respective second random numbers, wherein a distribution of the respective second random numbers is more uniform than a distribution of the first distribution.

11. The method of claim 9, wherein the first RNG circuit comprises a Gaussian RNG circuit.

12. The method of claim 9, wherein the first required performance characteristic comprises a throughput characteristic.

13. The method of claim 9, further comprising:
receiving, at second circuitry of the device, respective signals from each of the first RNG circuit and the multiple RNG circuits, wherein generating the one or more control signals is to provide the mode further with the second circuitry; and
with the second circuitry, based on the one or more control signals, selecting multiple ones of the respective signals from each of the first RNG circuit and the multiple RNG circuits.

14. The method of claim 9, further comprising
receiving, at second circuitry of the device, signals based on an output from the first RNG circuit, wherein generating the one or more control signals is to provide the mode further with the second circuitry; and
with the second circuitry, based on the one or more control signals, selecting between generating a fixed point value based on the signals, and generating a floating point value based on the signals.

15. The method of claim 9, further comprising:
receiving a second indication of a second criteria to be applied to a generation of a second one or more random numbers;
based on the second indication:
determining that the second criteria corresponds to a second mode of the device; and
generating a second one or more control signals to provide the second mode with the first circuitry;

with the first circuitry, based on the second one or more control signals:

selecting a second one or more RNG circuits from among the multiple RNG circuits;

receiving a second one or more inputs each from a respective one of the second one or more RNG circuits; and calculating the second one or more random numbers based on the second one or more inputs.

16. A system comprising:
a packaged device comprising:
a first random number generator (RNG) circuit;
multiple RNG circuits;
first circuitry coupled between the first RNG circuit and the multiple RNG circuits; and
second circuitry, coupled to the first circuitry, to receive an indication of a criteria to be applied to a generation of one or more random numbers, wherein, based on the indication, the second circuitry is to:
determine that the criteria corresponds to a first mode of the packaged device, comprising the second circuitry to:
access reference information based on the criteria, wherein the reference information corresponds different modes of the device each with a different respective one of requirement sets which each comprise a respective one or more required characteristics of random number generation, wherein a first requirement set of the requirement sets corresponds to the first mode of the device, and wherein the first requirement set comprises a first required statistical characteristic and a first required performance characteristic; and
identify the first requirement set as a closest match to the criteria based on both the first required statistical characteristic and the first required performance characteristic; and
generate one or more control signals to provide the first mode with the first circuitry;
wherein, based on the one or more control signals, the first circuitry is to:
select one or more RNG circuits from among the multiple RNG circuits;
receive one or more inputs each from a respective one of the one or more RNG circuits; and
calculate the one or more random numbers based on the one or more inputs; and
a display device coupled to the packaged device, the display device to display an image based on a signal communicated with the packaged device.

17. The system of claim 16, wherein:
the first RNG circuit is to generate first random numbers with a first distribution; and
for each of the multiple RNG circuits:
the each RNG circuit is to generate a respective second random numbers, wherein a distribution of the respective second random numbers is more uniform than a distribution of the first distribution.

18. The system of claim 16, wherein the first RNG circuit comprises a Gaussian RNG circuit.

19. The system of claim 18, wherein the Gaussian RNG comprises a Hadamard transform circuit.

20. The system of claim 16, the packaged device further comprising third circuitry coupled to receive signals based on an output from the first RNG circuit;
  wherein the second circuitry is to generate the one or more control signals to provide the mode further with the third circuitry; and
  wherein, based on the one or more control signals, the third circuitry is to select between generating a fixed point value based on the signals, and generating a floating point value based on the signals.

* * * * *